(12) United States Patent
Xie et al.

(10) Patent No.: US 10,833,601 B2
(45) Date of Patent: Nov. 10, 2020

(54) MULTI-LEVEL INVERTER

(71) Applicant: SCHNEIDER ELECTRIC IT CORPORATION, West Kingston, RI (US)

(72) Inventors: Jingwen Xie, Shanghai (CN); Hairong Zhang, Shanghai (CN); Yuanqian Dong, Shanghai (CN); Zhiyan Liu, Shanghai (CN)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 0 days.

(21) Appl. No.: 16/459,769

(22) Filed: Jul. 2, 2019

(65) Prior Publication Data

US 2020/0021203 A1 Jan. 16, 2020

(30) Foreign Application Priority Data

Jul. 10, 2018 (CN) .......................... 2018 1 0750024

(51) Int. Cl.
*H02M 7/483* (2007.01)
*H02M 1/088* (2006.01)
*H02M 7/5395* (2006.01)
*H02J 9/06* (2006.01)

(52) U.S. Cl.
CPC ............ *H02M 7/483* (2013.01); *H02M 1/088* (2013.01); *H02M 7/5395* (2013.01); *H02J 9/062* (2013.01)

(58) Field of Classification Search
CPC ....... H02M 7/483; H02M 7/5395; H02J 9/062
See application file for complete search history.

(56) References Cited

U.S. PATENT DOCUMENTS

2013/0094260 A1 4/2013 Martini et al.
2018/0278175 A1* 9/2018 Korhonen ............. H02M 1/088
2019/0267889 A1* 8/2019 McBryde ............. H02M 7/487

OTHER PUBLICATIONS

Extended European Search Report from corresponding Europea Application No. 19184084.2 dated Sep. 23, 2019.
Bonny G.A. Cacau et al: "Fi ve-level T-type inverter based on multi-state switching cell", Industry Applications (INDUSCON), 2012 10th IEEE/IAS International Conference on, IEEE, Nov. 5, 2012 (Nov. 5, 2012), pp. 1-8, XP032326278, DOI: 10.1109/INDUSCON.2012.6453728 ISBN: 978-1-4673-2412-0.

* cited by examiner

*Primary Examiner* — Jue Zhang
*Assistant Examiner* — Trinh Q Dang
(74) *Attorney, Agent, or Firm* — Lando & Anastasi, LLP

(57) ABSTRACT

According to one aspect, embodiments of the invention provide an inverter comprising an input, an output, a plurality of DC busses, a mid-point bus, an LC filter, a common node coupled to the LC filter, a plurality of switches coupled to the plurality of DC busses and the common node, a bidirectional switch coupled between the mid-point bus and the common node, and a controller configured to operate the plurality of switches and the bidirectional switch in a first mode of operation to generate a voltage at the common node at a first positive DC voltage level, in a second mode of operation to generate the voltage at a second positive DC voltage level, in a third mode of operation to generate the voltage at a first negative DC voltage level, and in a fourth mode of operation to generate the voltage at a second negative DC voltage level.

20 Claims, 16 Drawing Sheets

MULTI-LEVEL INVERTER

CROSS-REFERENCE TO RELATED APPLICATION

This application claims the benefit under 35 U.S.C. § 119 of Chinese Patent Application No. 201810750024.7 filed on Jul. 10, 2018 which is hereby incorporated herein by reference in its entirety for all purposes.

BACKGROUND

1. Field of Invention

The present invention relates generally to systems and methods for controlling an uninterruptible power supply (UPS).

2. Discussion of Related Art

The use of power devices, such as uninterruptible power supplies (UPS), to provide regulated, uninterrupted power for sensitive and/or critical loads, such as computer systems and other data processing systems, is known. Known uninterruptible power supplies include on-line UPS's, off-line UPS's, line interactive UPS's as well as others. On-line UPS's provide conditioned AC power as well as back-up AC power upon interruption of a primary source of AC power. Off-line UPS's typically do not provide conditioning of input AC power, but do provide back-up AC power upon interruption of the primary AC power source. Line interactive UPS's are similar to off-line UPS's in that they switch to battery power when a blackout occurs but also typically include a multi-tap transformer for regulating the output voltage provided by the UPS.

SUMMARY

At least one aspect of the invention is directed to an inverter comprising an input configured to be coupled to a DC source and to receive input DC power from the DC source, an output configured to be coupled to a load and to provide output AC power to the load, a plurality of DC busses coupled to the input and configured to receive the input DC power from the DC source, a mid-point bus coupled to the input and to the plurality of DC busses, an LC filter coupled to the output, a common node coupled to the LC filter, a plurality of switches coupled to the plurality of DC busses and the common node, a bidirectional switch coupled between the mid-point bus and the common node, and a controller configured to operate the plurality of switches and the bidirectional switch in a first mode of operation to generate a voltage at the common node at a first positive DC voltage level, to operate the plurality of switches and the bidirectional switch in a second mode of operation to generate the voltage at the common node at a second positive DC voltage level, to operate the plurality of switches and the bidirectional switch in a third mode of operation to generate the voltage at the common node at a first negative DC voltage level, and to operate the plurality of switches and the bidirectional switch in a fourth mode of operation to generate the voltage at the common node at a second negative DC voltage level. In one embodiment, the LC filter is configured to provide an output AC voltage waveform to the output derived from the voltage at the common node during the first, second, third, and fourth modes of operation.

According to one embodiment, in the first mode of operation, the controller is further configured to operate the plurality of switches and the bidirectional switch to generate voltage pulses at the common node alternating between zero and the first positive DC voltage level, in the second mode of operation, the controller is further configured to operate the plurality of switches and the bidirectional switch to generate voltage pulses at the common node alternating between the first positive DC voltage level and the second positive DC voltage level, in the third mode of operation, the controller is further configured to operate the plurality of switches and the bidirectional switch to generate voltage pulses at the common node alternating between zero and the first negative DC voltage level, and in the fourth mode of operation, the controller is further configured to operate the plurality of switches and the bidirectional switch to generate voltage pulses at the common node alternating between the first negative DC voltage level and the second negative DC voltage level.

According to another embodiment, the plurality of DC busses comprises a first positive DC bus coupled to the input, a second positive DC bus coupled to the input, a first negative DC bus coupled to the input, and a second negative DC bus coupled to the input, and the plurality of switches comprises a first switch coupled to the first positive DC Bus, a second switch coupled between the first switch and the common node, a third switch coupled to the first negative DC bus, and a fourth switch coupled between the third switch and the common node. In one embodiment, the inverter further comprises a first diode coupled between the second positive DC bus and the second switch, and a second diode coupled between the second negative DC bus and the fourth switch. In another embodiment, the inverter further comprises a first capacitor coupled between the first positive DC bus and the second positive DC bus, a second capacitor coupled between the second positive DC bus and the mid-point bus, a third capacitor coupled between the first negative DC bus and the second negative DC bus, and a fourth capacitor coupled between the second negative DC bus and the mid-point bus.

According to one embodiment, the controller is further configured to operate, in a first stage of the first mode of operation, the plurality of switches to provide current from the second capacitor to the common point via the second positive DC bus, the first diode, and the second switch, and to operate, in a second stage of the first mode of operation, the bidirectional switch to provide current from the mid-point bus to the common node via the bidirectional switch. In one embodiment, the controller is further configured to operate, in a first stage of the second mode of operation, the plurality of switches to provide current from the first capacitor to the common point via the first positive DC bus, the first switch, and the second switch, and to operate, in a second stage of the second mode of operation, the plurality of switches to provide current from the second capacitor to the common point via the second positive DC bus, the first diode, and the second switch.

According to another embodiment, the controller is further configured to operate, in a first stage of the third mode of operation, the plurality of switches to provide current from the common point to the third capacitor via the second negative DC bus, the second diode, and the fourth switch, and to operate, in a second stage of the third mode of operation, the bidirectional switch to provide current from the common node to the mid-point bus via the bidirectional switch. In one embodiment, the controller is further configured to operate, in a first stage of the fourth mode of operation, the plurality of switches to provide current from the common point to the fourth capacitor via the first negative DC bus, the third switch, and the fourth switch, and to operate, in a second stage of the fourth mode of operation, the plurality of switches to provide current from the common point to the third capacitor via the second negative DC bus, the second diode, and the fourth switch.

According to one embodiment, the controller is further configured to operate, in a first stage of a fifth mode of operation occurring during a transition from the second mode of operation to the third mode of operation, the plurality of switches to provide current from the common point to the first capacitor via the first positive DC bus, the first switch, and the second switch, and to operate, in a second stage of the fifth mode of operation, the bidirectional switch to provide current from the common node to the mid-point bus via the bidirectional switch. In one embodiment, the controller is further configured to operate, in a first stage of a sixth mode of operation occurring during a transition from the third mode of operation to the second mode of operation, the plurality of switches to provide current from the fourth capacitor to the common point via the first negative DC bus, the third switch, and the fourth switch, and to operate, in a second stage of the sixth mode of operation, the bidirectional switch to provide current from the mid-point bus to the common node via the bidirectional switch.

According to another embodiment, the bidirectional switch comprises a third diode coupled to the mid-point bus, a fifth switch coupled between the third diode and the common point, a fourth diode coupled to the common point, and a sixth switch coupled between the fourth diode and the mid-point bus.

Another aspect of the invention is directed to a method for operating an inverter comprising an input configured to be coupled to a DC source, an output, a plurality of DC busses, a mid-point bus coupled to the input and to the plurality of DC busses, an LC filter coupled to the output, a common node coupled to the LC filter, a plurality of switches coupled to the plurality of DC busses and the common node, and a bidirectional switch coupled between the mid-point bus and the common node, the method comprising receiving, at the input, input DC power from a DC source, operating the plurality of switches and the bidirectional switch in a first mode of operation to generate a voltage at the common node at a first positive DC voltage level, operating the plurality of switches and the bidirectional switch in a second mode of operation to generate the voltage at the common node at a second positive DC voltage level, operating the plurality of switches and the bidirectional switch in a third mode of operation to generate the voltage at the common node at a first negative DC voltage level, operating the plurality of switches and the bidirectional switch in a fourth mode of operation to generate the voltage at the common node at a second negative DC voltage level, and generating, with the LC filter, an output AC voltage waveform at the output derived from the voltage at the common node during the first, second, third, and fourth modes of operation.

According to one embodiment, operating the plurality of switches and the bidirectional switch in the first mode of operation includes operating the plurality of switches and the bidirectional switch to generate voltage pulses at the common node alternating between zero and the first positive DC voltage level, operating the plurality of switches and the bidirectional switch in the second mode of operation includes operating the plurality of switches and the bidirectional switch to generate voltage pulses at the common node alternating between the first positive DC voltage level and the second positive DC voltage level, operating the plurality of switches and the bidirectional switch in the third mode of operation includes operating the plurality of switches and the bidirectional switch to generate voltage pulses at the common node alternating between zero and the first negative DC voltage level, and operating the plurality of switches and the bidirectional switch in the fourth mode of operation includes operating the plurality of switches and the bidirectional switch to generate voltage pulses at the common node alternating between the first negative DC voltage level and the second negative DC voltage level.

According to another embodiment, the plurality of DC busses includes a first positive DC bus, a second positive DC bus, a first negative DC bus, and a second negative DC bus, wherein the plurality of switches comprises a first switch coupled to the first positive DC Bus, a second switch coupled between the first switch and the common node, a third switch coupled to the first negative DC bus, and a fourth switch coupled between the third switch and the common node, and operating the plurality of switches and the bidirectional switch to generate the voltage pulses at the common node alternating between zero and the first positive DC voltage level includes operating, in a first stage of the first mode of operation, the plurality of switches to provide current from the mid-point bus to the common point via the second positive DC bus and the second switch, and operating, in a second stage of the first mode of operation, the bidirectional switch to provide current from the mid-point bus to the common node via the bidirectional switch.

According to one embodiment, operating the plurality of switches and the bidirectional switch to generate the voltage pulses at the common node alternating between the first positive DC voltage level and the second positive DC voltage level includes operating, in a first stage of the second mode of operation, the plurality of switches to provide current from the mid-point bus to the common point via the first positive DC bus, the first switch, and the second switch, and operating, in a second stage of the second mode of operation, the plurality of switches to provide current from the mid-point bus to the common point via the second positive DC bus and the second switch. In another embodiment, operating the plurality of switches and the bidirectional switch to generate the voltage pulses at the common node alternating between zero and the first negative DC voltage level includes operating, in a first stage of the third mode of operation, the plurality of switches to provide current from the common point to the mid-point bus via the second negative DC bus and the fourth switch, and operating, in a second stage of the third mode of operation, the bidirectional switch to provide current from the common node to the mid-point bus via the bidirectional switch.

According to another embodiment, operating the plurality of switches and the bidirectional switch to generate the voltage pulses at the common node alternating between the first negative DC voltage level and the second negative DC voltage level includes operating, in a first stage of the fourth mode of operation, the plurality of switches to provide current from the common point to the mid-point bus via the first negative DC bus, the third switch, and the fourth switch, and operating, in a second stage of the fourth mode of operation, the plurality of switches to provide current from the common point to the mid-point bus via the second negative DC bus and the fourth switch.

At least one aspect of the invention is directed to an inverter comprising an input configured to be coupled to a DC source and to receive input DC power from the DC source, an output configured to be coupled to a load and to provide output AC power to the load, a plurality of DC busses coupled to the input and configured to receive the input DC power from the DC source, a mid-point bus coupled to the input and to the plurality of DC busses an LC filter coupled to the output, a common node coupled to the LC filter, a plurality of switches coupled to the plurality of DC busses and the common node, and means for coupling the mid-point bus to the common node to switch a voltage at the common node between five different voltage levels, and for providing an output AC voltage waveform to the output derived from the five different voltage levels.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
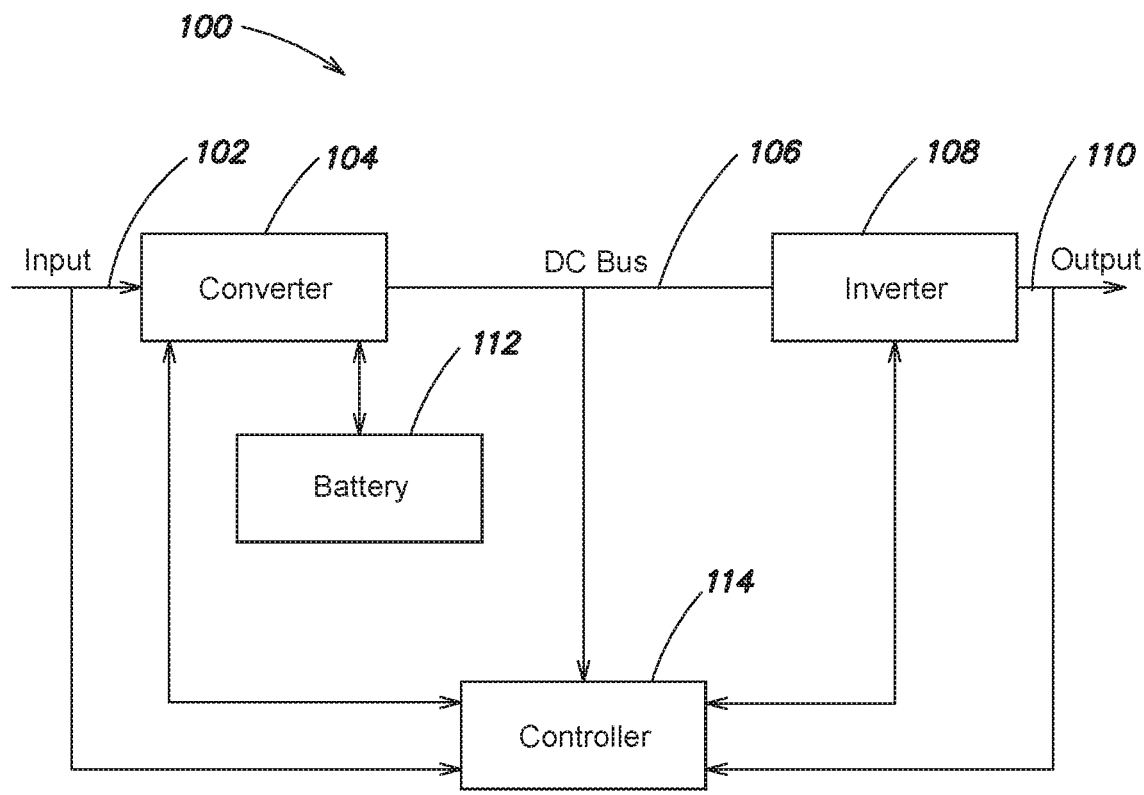
FIG. 1 is a block diagram of an online UPS according to aspects described herein.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, power devices, such as uninterruptible power supplies (UPS) are oftentimes used to provide regulated, uninterrupted power to sensitive and/or critical loads. A conventional online UPS rectifies input AC power provided by an electric utility using a Power Factor Correction circuit (PFC) to provide DC power to a DC bus. The rectified DC power on the DC Bus is typically used to charge a battery while mains power is available. In the absence of mains power, the battery discharges and provides DC power to the DC bus. From the DC power on the DC bus, an inverter generates an AC output voltage that is provided to a load. Since the DC bus is powered either by mains or the battery, the output power of the UPS is uninterrupted if the mains fails and the battery is sufficiently charged. Typical online UPS's may also operate in a bypass mode where unconditioned power with basic protection is provided directly from an AC power source to a load via a bypass line.

One common approach to improve the efficiency of a UPS is to utilize multi-level power converters within the UPS. One type of multi-level power converter that is typically used in a UPS is a five-level inverter that is able to switch between five voltage levels: a first positive DC voltage level, a second positive DC voltage level, a mid-point zero voltage level, a first negative DC voltage level, and a second negative DC voltage level. However, such 5-level inverters are generally complex, include a large number of power switches, and are relatively expensive. As a result, the use of five-level inverters is typically limited.

In at least one embodiment, a quasi-five-level inverter system and method is provided that can reduce the traditional five-level inverter disadvantages described above while providing relatively high efficiency and low harmonic distortion.

FIG. 1 is a block diagram of an online UPS 100 according to one aspect of the present invention. The UPS 100 includes an input 102, a converter 104, a DC bus 106, an inverter 108, an output 110, a battery 112, and a controller 114. The input 102 is coupled to the converter 104. The DC bus 106 is coupled between the converter 104 and the inverter 108. The output 110 is coupled to the inverter 108. The controller 114 is coupled to the input 102, the output 110, the converter 104, the DC bus 106, and the inverter 108. The battery is coupled to the converter 104.

The input 102 is configured to be coupled to an AC mains power source and to receive input AC power having an input voltage level. The controller 114 monitors the input AC power received by the input 102 and is configured to operate the UPS 100 in different modes of operation based on the status of the input AC power received by the input 102. When AC power provided to the input 102 is acceptable (i.e., above an input power threshold), the controller 114 operates the UPS 100 in a normal mode of operation. In the normal mode of operation, AC power from the input 102 is provided to the converter 104. According to one embodiment, the converter 104 is a Power Factor Correction converter 104; however, in other embodiments, other types of converters may be utilized.

The controller 114 operates the converter 104 to convert the AC power into DC power and provide the DC power to the DC bus 106. In one embodiment, DC power is also provided from the converter 104 to the battery 112 to charge the battery 112. In another embodiment, DC power from the DC bus 106 is provided to the battery 112 via a DC/DC converter to charge the battery 112. In the normal mode of operation, the inverter 108 receives DC power from the DC bus 106, and the controller 114 operates the inverter 108 to convert the DC power into regulated AC power and provide regulated AC power to a load coupled to the output 110.

When AC power provided to the input 102 is not acceptable (i.e., below an input power threshold), the controller 114 operates the UPS 100 in a backup mode of operation. In the backup mode of operation, DC power from the battery 112 is regulated (e.g., by the converter 104 or a DC/DC converter coupled to the battery 112) and provided to the DC bus 106. The inverter 108 receives the DC power from the DC bus 106, and the controller 114 operates the inverter 108 to convert the DC power into regulated AC power and provide the regulated AC power to the output 110.

Figure 2:
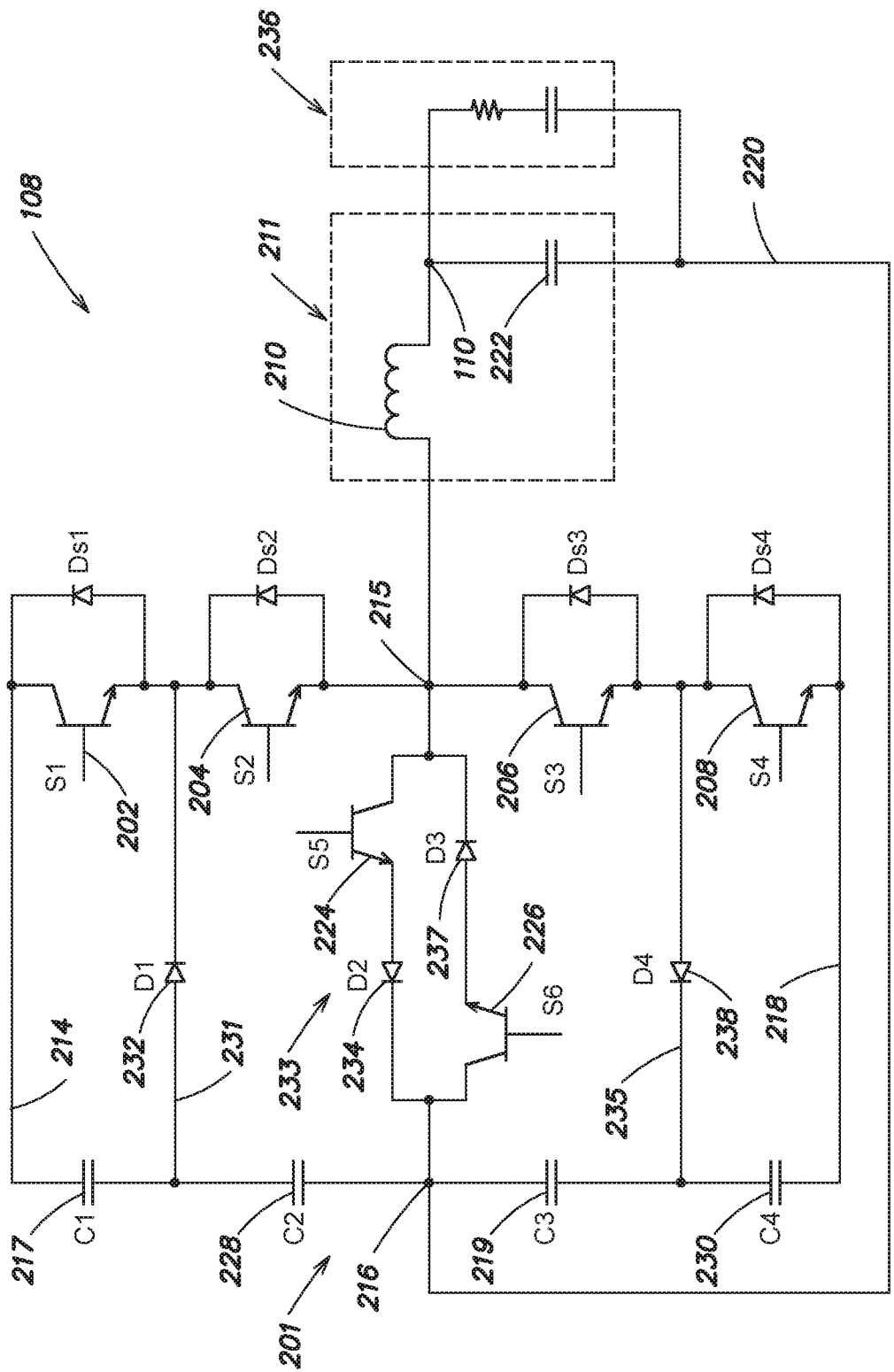
FIG. 2 is a schematic diagram of an inverter according to aspects described herein.

FIG. 2 is a schematic diagram of the inverter 108 according to at least one embodiment described herein. The inverter 108 is a quasi-five-level inverter. As shown in FIG. 2, the inverter 108 includes an input 201 and a plurality of switches including a first switch (S1) 202, a second switch (S2) 204, a third switch (S3) 206, and a fourth switch (S4) 208. The inverter 108 also includes a bidirectional switch 233, an LC filter 211, a first positive bus 214, a second positive bus 231, a mid-point bus 216, a first negative bus 218, a second negative bus 235, a neutral line 220, a first capacitor (C1) 217, a second capacitor (C2) 228, a third capacitor (C3) 219, a fourth capacitor (C4) 230, a first diode (D1) 232, and a fourth diode (D4) 238. In one embodiment, the bidirectional switch 233 includes a fifth switch (S5) 224, a sixth switch (S6) 226, a second diode (D2) 234, and a third diode (D3) 237. In other embodiments, the bidirectional switch 233 can be another type of bidirectional switch.

The LC filter 211 includes an output inductor 210 and an output capacitor 222. In one embodiment, each of the switches 202, 204, 206, 208, 224, 226 is an Insulated Gate Bipolar Transistor (IGBT); however, in other embodiments, each switch 202, 204, 206, 208, 224, 226 can be another appropriate type of switch and/or transistor (e.g., a Metal-Oxide-Semiconductor Field-Effect Transistor (MOSFET)). According to at least one embodiment, each switch 202, 204, 206, 208, 224, 226 includes a diode connected in anti-parallel to the switch. In at least one embodiment, the diode is the intrinsic body-diode of a MOSFET or a co-pack diode of an IGBT.

According to at least one embodiment as shown in FIG. 2, the collector of the first switch (S1) 202 is coupled to the first positive bus 214 and the emitter of the first switch (S1) 202 is coupled to the collector of the second switch (S2) 204. The emitter of the second switch (S2) 204 is coupled to a common point 215. A first terminal of the first capacitor (C1) 217 is coupled to the first positive bus 214 and a second terminal of the first capacitor (C1) 217 is coupled to the second positive bus 231. The second positive bus 231 is coupled to the emitter of the first switch (S1) 202 via the first diode (D1) 232. A first terminal of the second capacitor (C2) 228 is coupled to the second positive bus 231 and a second terminal of the second capacitor (C2) 228 is coupled to the mid-point bus 216.

The collector of the third switch (S3) 206 is coupled to the common point 215 and the emitter of the third switch (S3) 206 is coupled to the collector of the fourth switch (S4) 208. The emitter of the fourth switch (S4) 208 is coupled to the first negative bus 218. A first terminal of the third capacitor (C3) 219 is coupled to the mid-point bus 216 and a second terminal of the third capacitor (C3) 219 is coupled to the second negative bus 235. The second negative bus 235 is coupled to the emitter of the third switch (S3) 206 via the fourth diode (D4) 238. A first terminal of the fourth capacitor (C4) 230 is coupled to the second negative bus 235 and a second terminal of the fourth capacitor (C4) 230 is coupled to the first negative bus 218.

The emitter of the fifth switch (S5) 224 is coupled to the mid-point bus 216 via the second diode (D2) 234. The collector of the fifth switch (S5) 224 is coupled to the common point 215. The collector of the sixth switch (S6) 226 is coupled to the mid-point bus 216. The emitter of the sixth switch (S6) 226 is coupled to the common point 215 via the third diode (D3) 237. The common point 215 is coupled to a first end of the inductor 210. The second end of the inductor 210 is coupled to the output 110 of the UPS 100. According to at least one embodiment, the output 110 is also coupled to a neutral line 220 via the output capacitor 222. The neutral line is also coupled to the mid-point bus 216. The controller 114 is coupled to the gate of each switch 202, 204, 206, 208, 224, 226 and is configured to provide control signals to the gate of each switch 202, 204, 206, 208, 224, 226.

Figure 3:
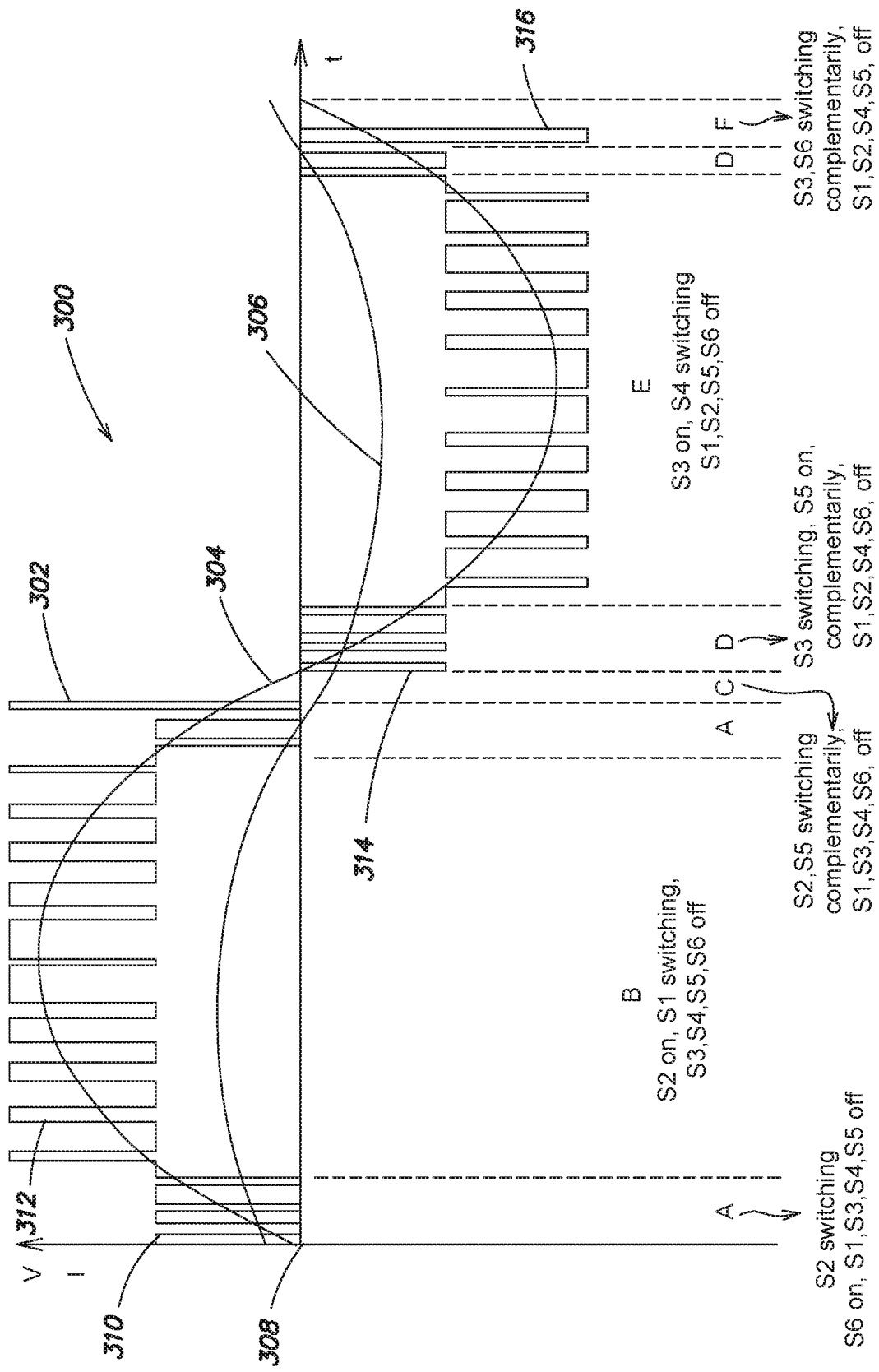
FIG. 3 is a graph illustrating operation of an inverter according to aspects described herein.

Operation of the inverter is discussed in greater detail below with reference to FIGS. 3-15. FIG. 3 is a graph 300 including a first trace 302 illustrating voltage of the inverter 108 at the common point 215 over different operating modes (A-F) of the inverter 108, a second trace 304 illustrating filtered output voltage of the inverter 108 at the output 110 over the different operating modes (A-F) of the inverter 108, and a third trace 306 illustrating load current of the inverter 08 over the different operating modes (A-F) of the inverter 108.

Figure 4:
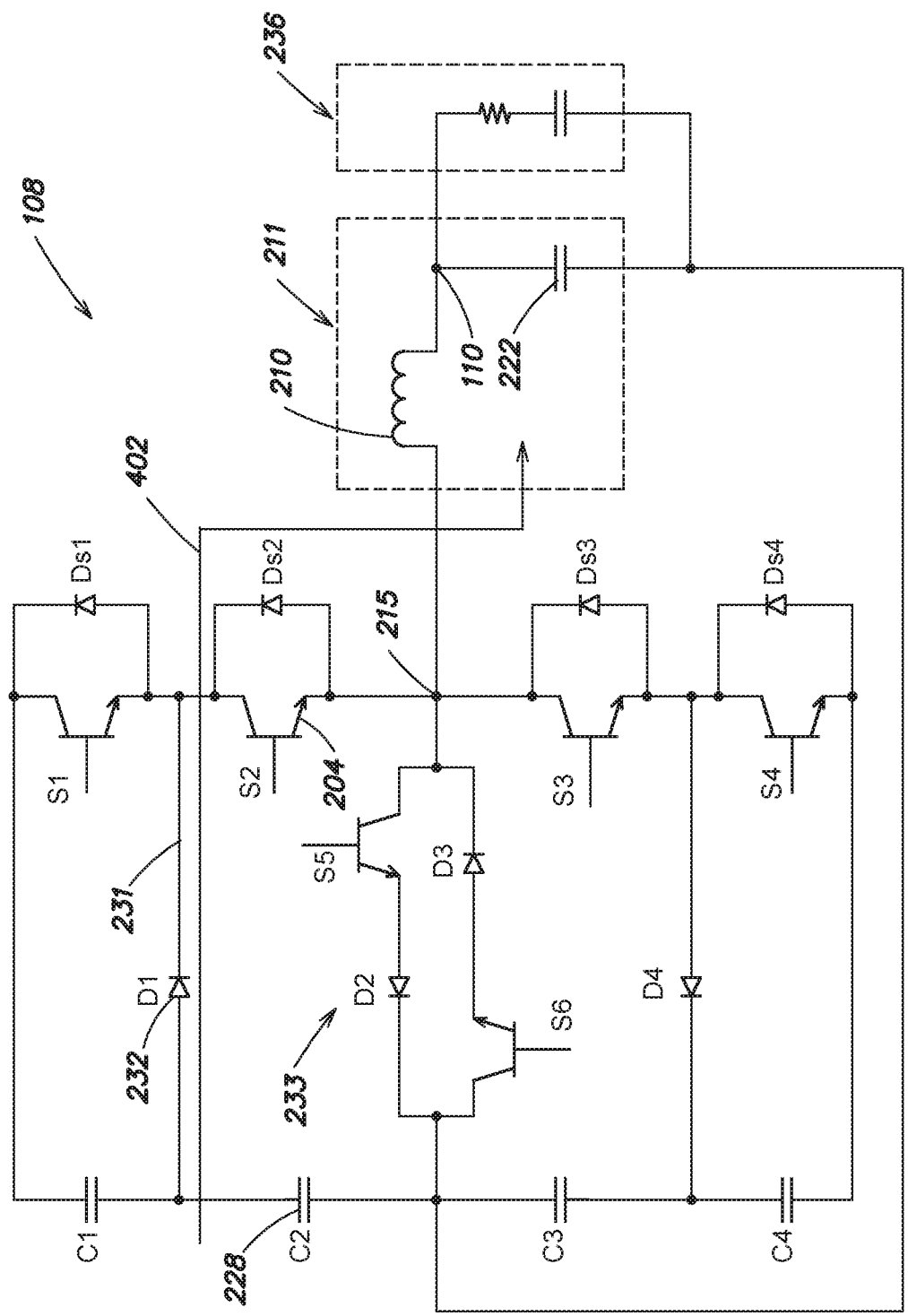
FIG. 4 is a schematic diagram of an inverter operating in a first stage of a first mode of operation according to aspects described herein.
Figure 5:
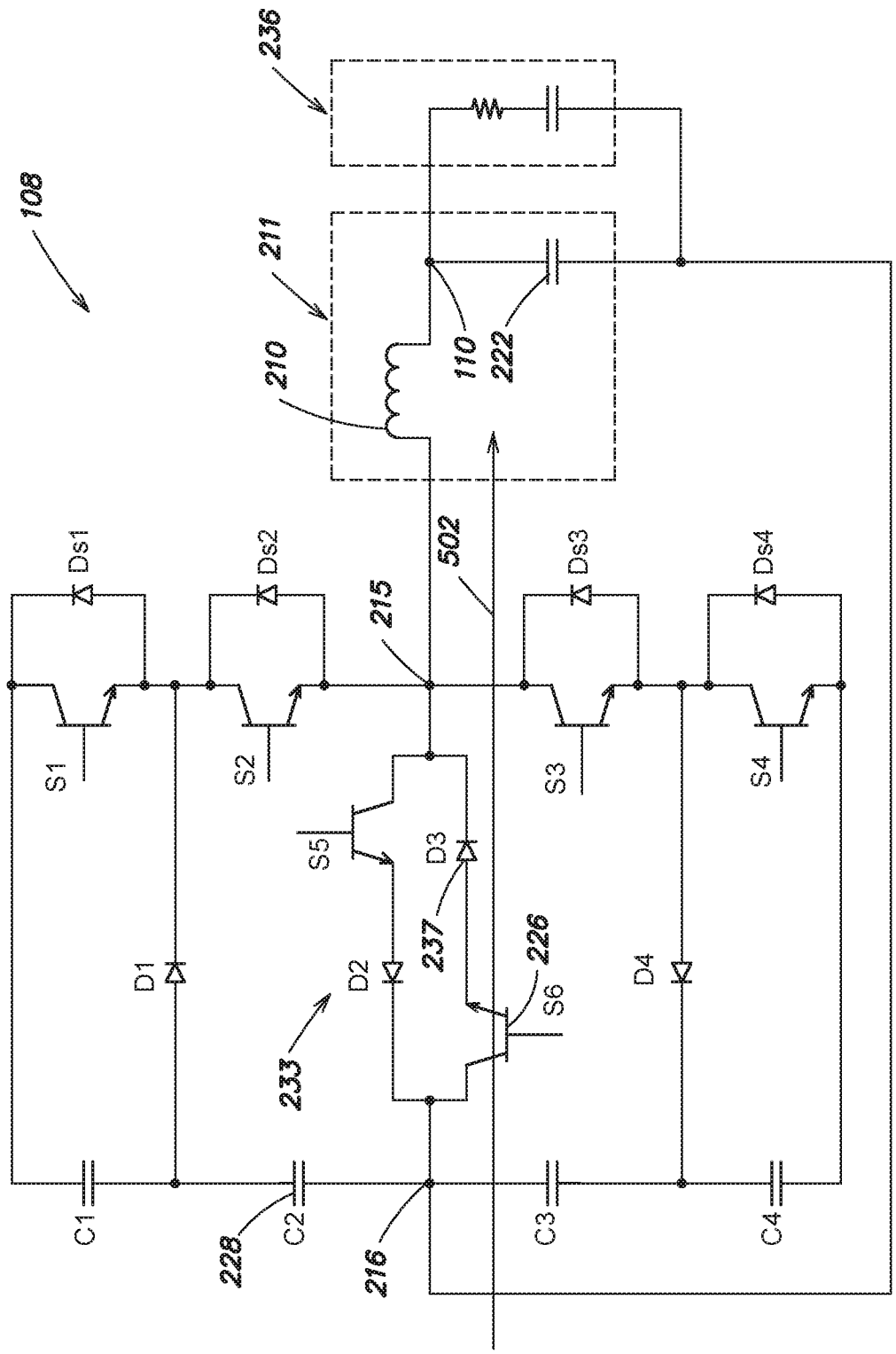
FIG. 5 is a schematic diagram of an inverter operating in a second stage of a first mode of operation according to aspects described herein.
Figure 6:
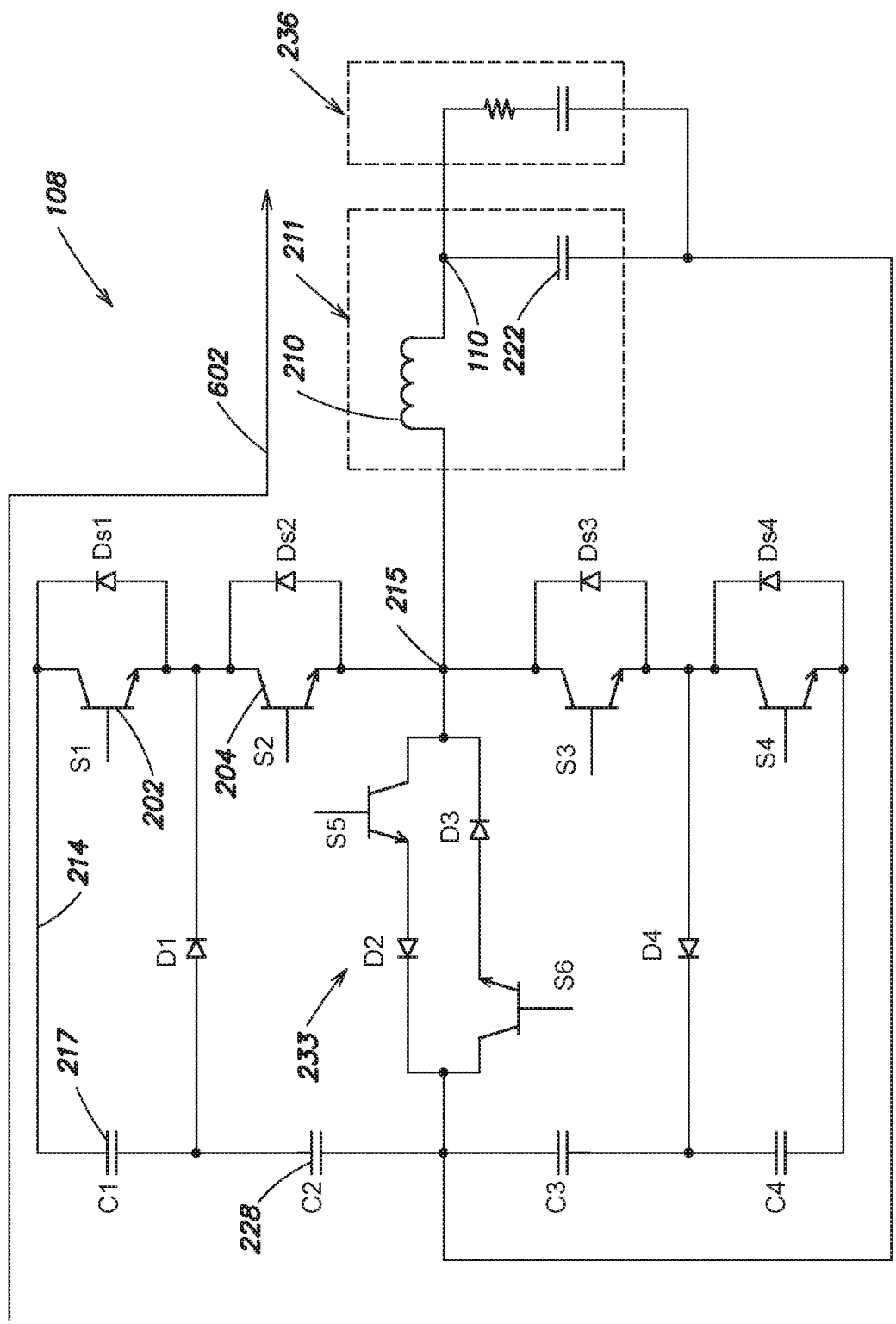
FIG. 6 is a schematic diagram of an inverter operating in a first stage of a second mode of operation according to aspects described herein.
Figure 7:
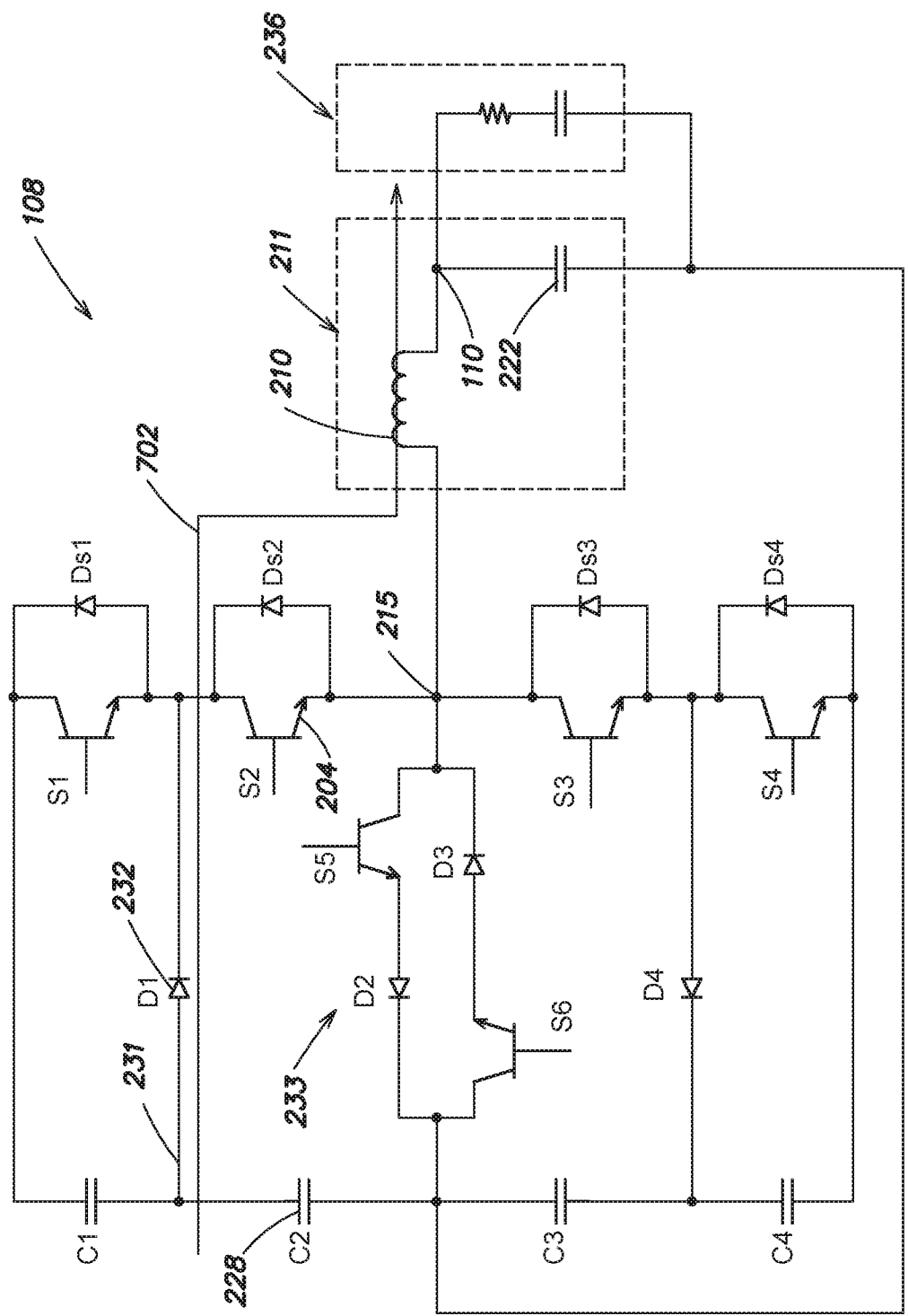
FIG. 7 is a schematic diagram of an inverter operating in a second stage of a second mode of operation according to aspects described herein.
Figure 8:
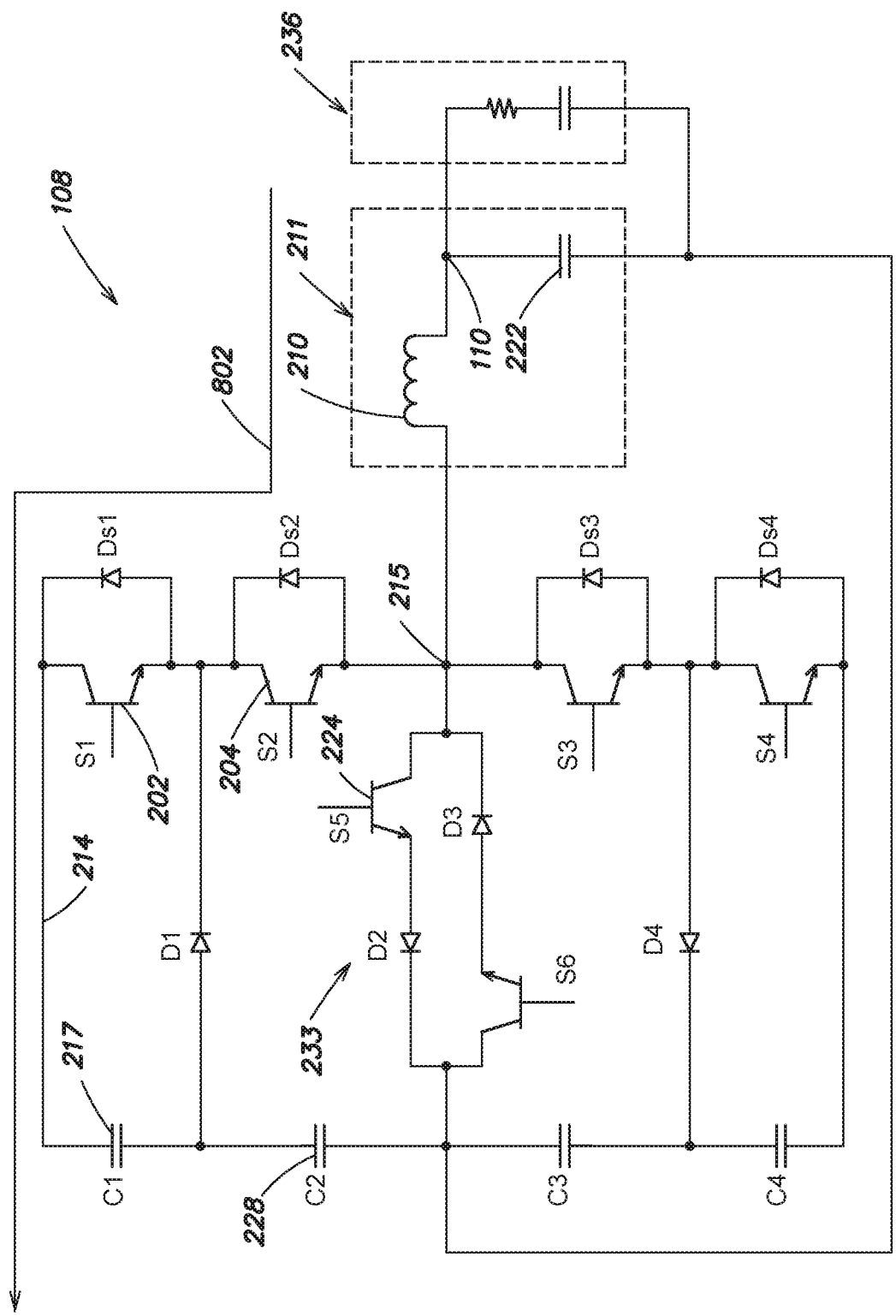
FIG. 8 is a schematic diagram of an inverter operating in a first stage of a third mode of operation according to aspects described herein.
Figure 9:
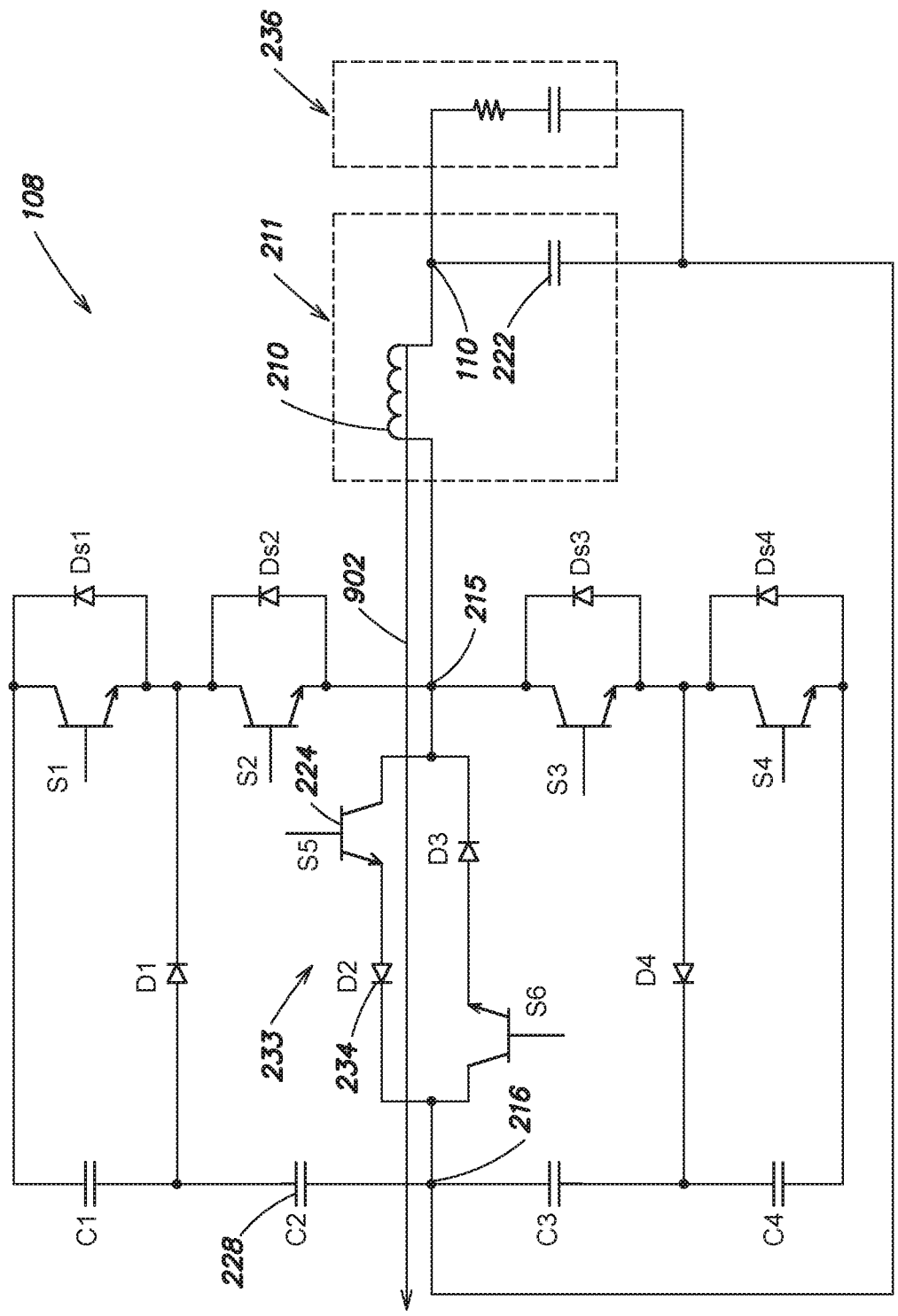
FIG. 9 is a schematic diagram of an inverter operating in a second stage of a third mode of operation according to aspects described herein.
Figure 10:
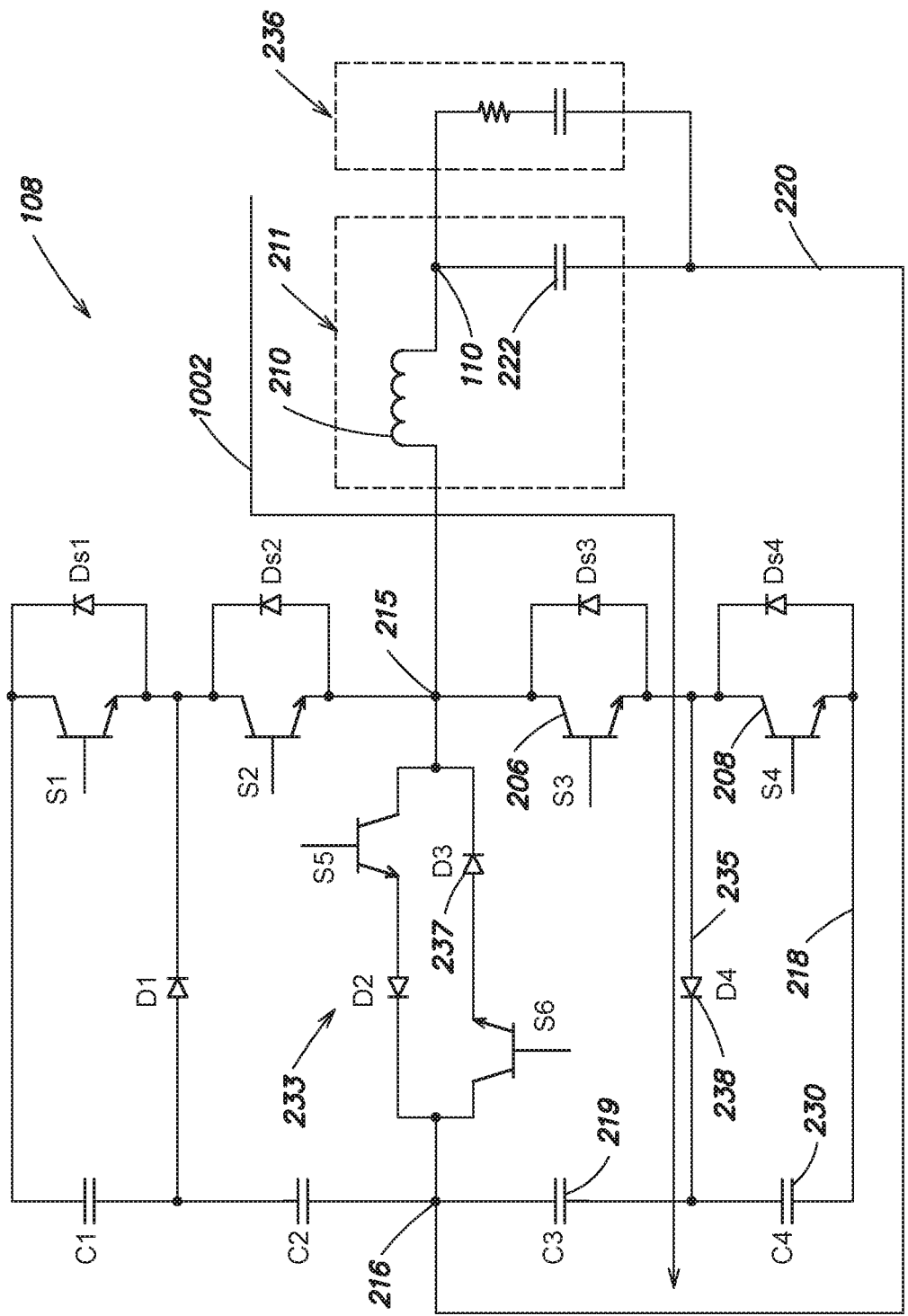
FIG. 10 is a schematic diagram of an inverter operating in a first stage of a fourth mode of operation according to aspects described herein.
Figure 11:
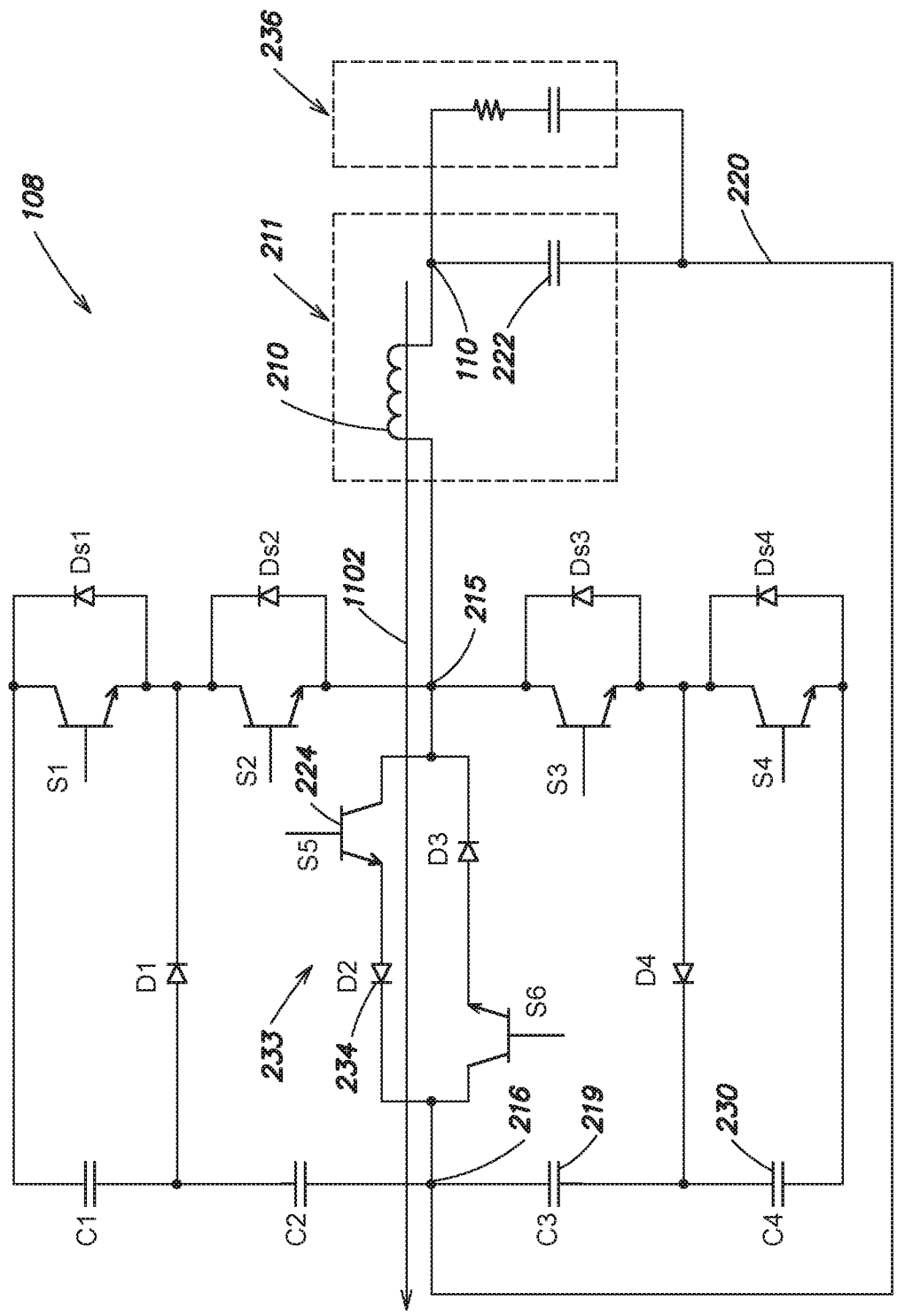
FIG. 11 is a schematic diagram of an inverter operating in a second stage of a fourth mode of operation according to aspects described herein.
Figure 12:
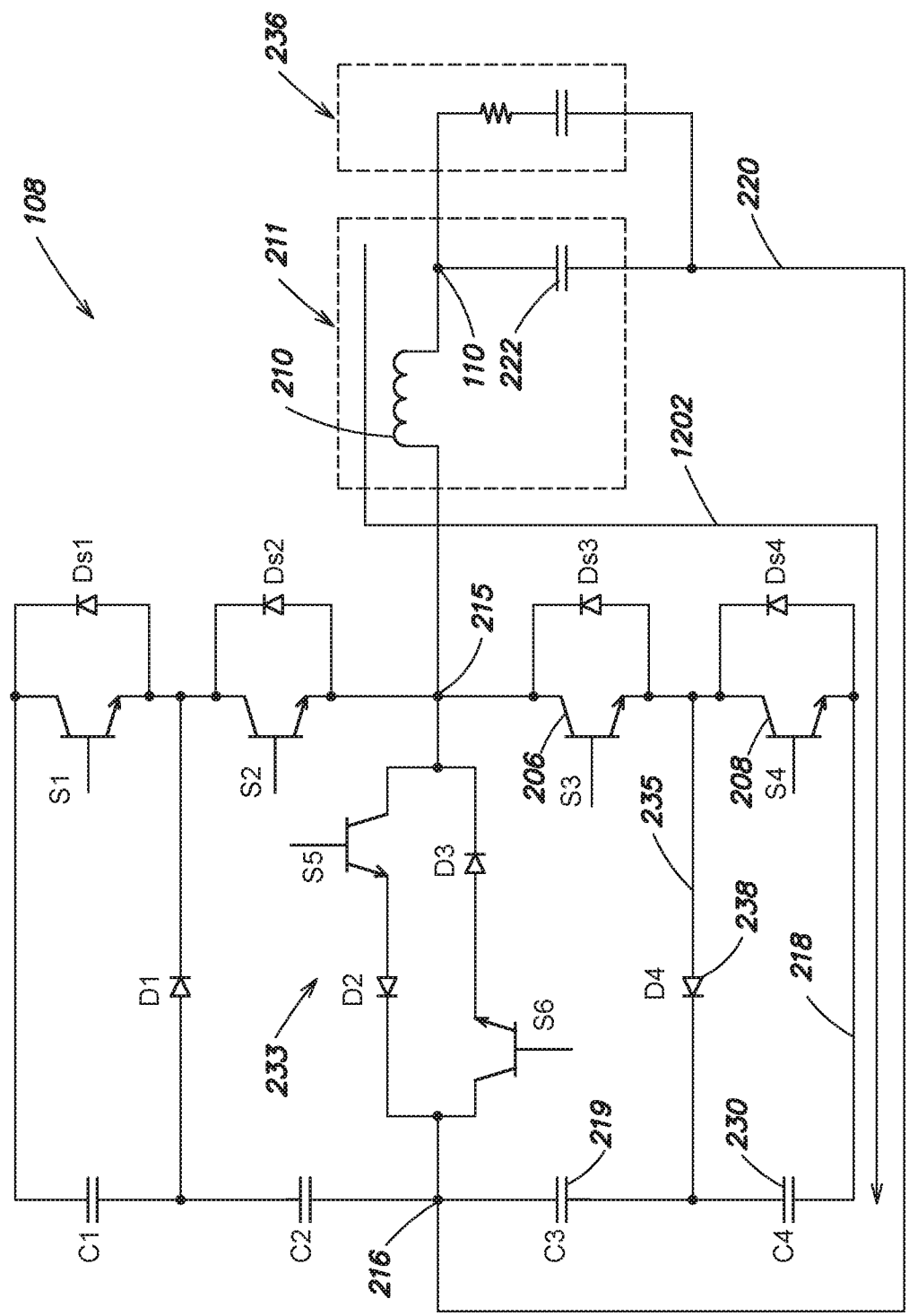
FIG. 12 is a schematic diagram of an inverter operating in a first stage of a fifth mode of operation according to aspects described herein.
Figure 13:
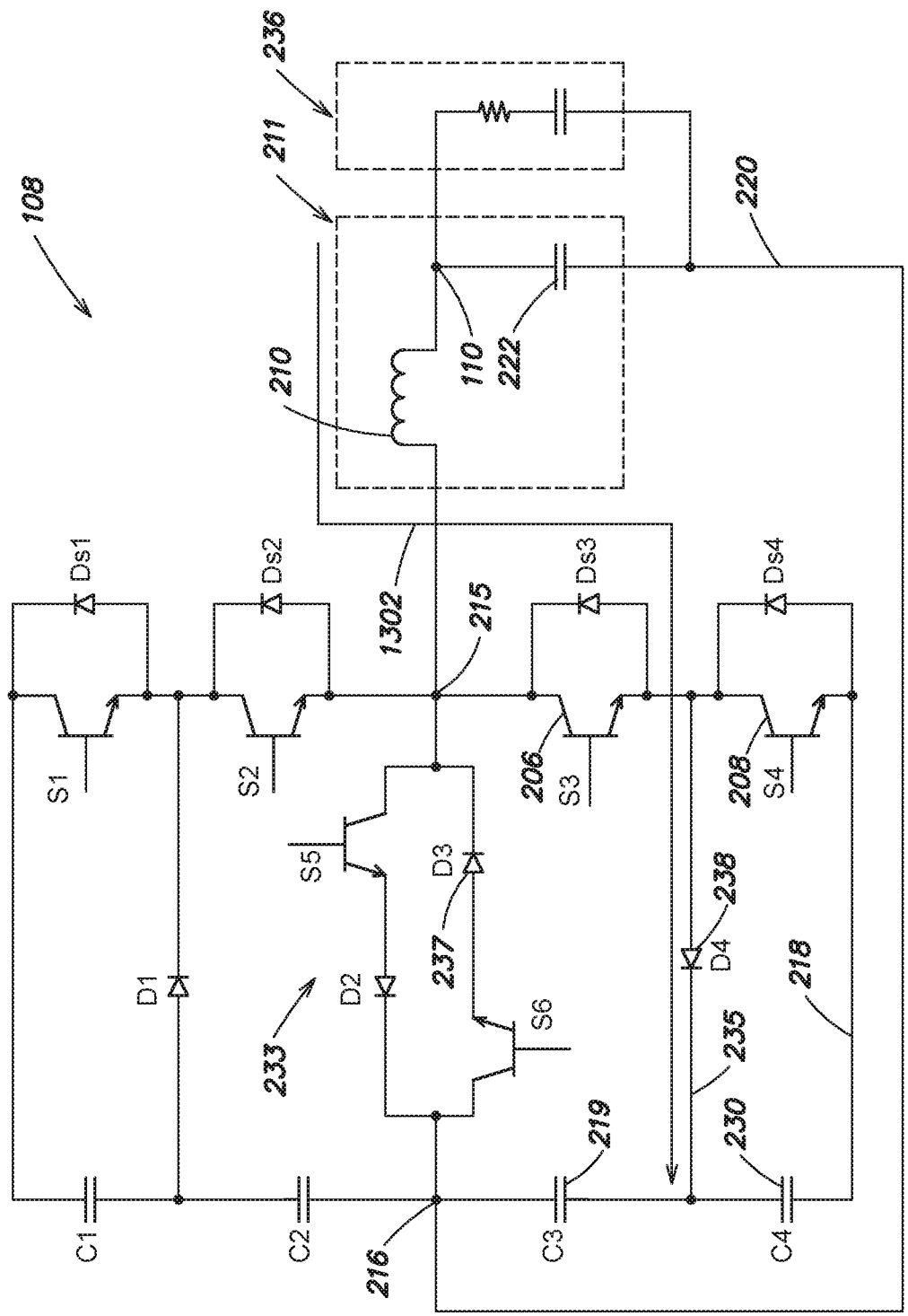
FIG. 13 is a schematic diagram of an inverter operating in a second stage of a fifth mode of operation according to aspects described herein.
Figure 14:
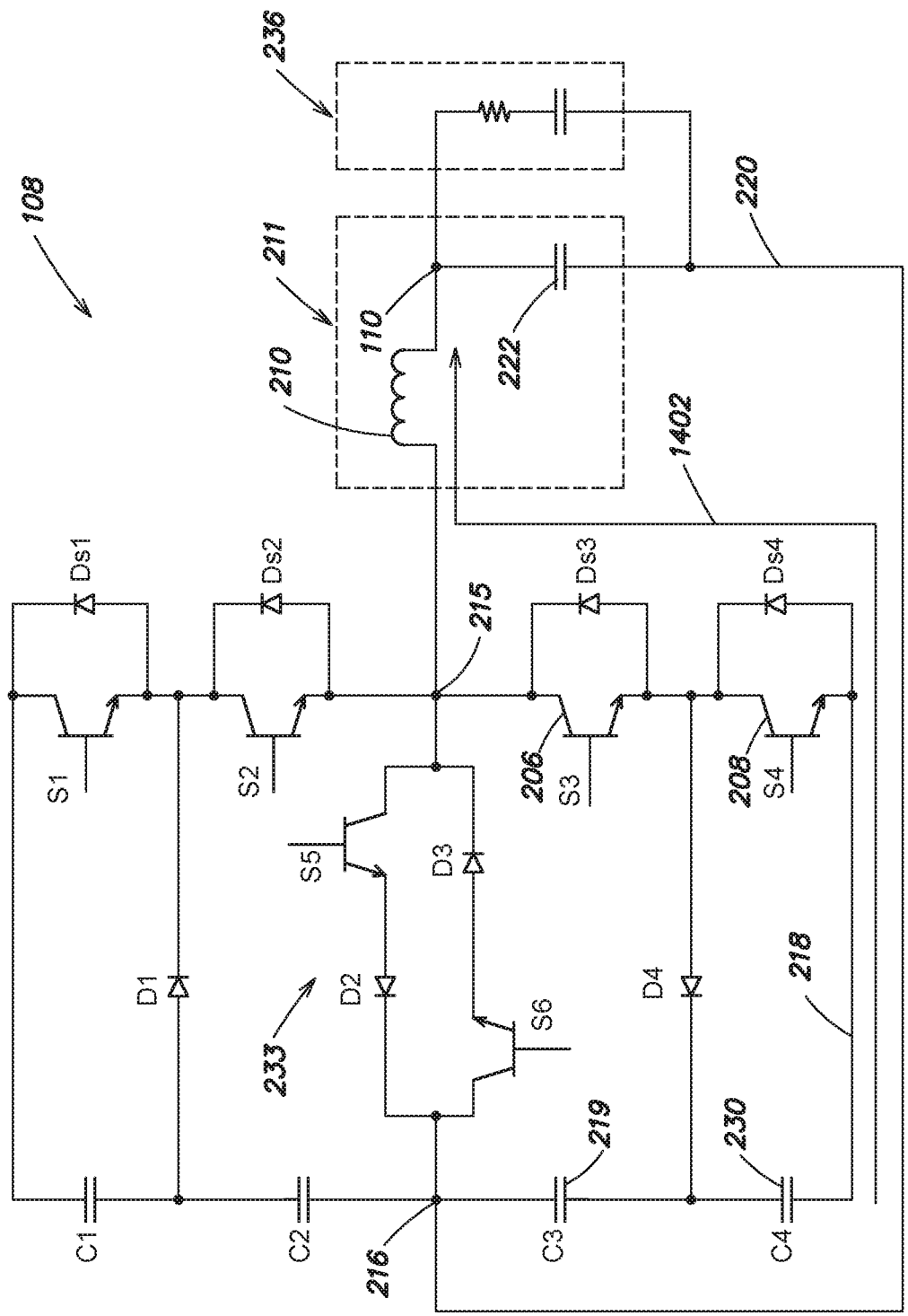
FIG. 14 is a schematic diagram of an inverter operating in a first stage of a sixth mode of operation according to aspects described herein.
Figure 15:
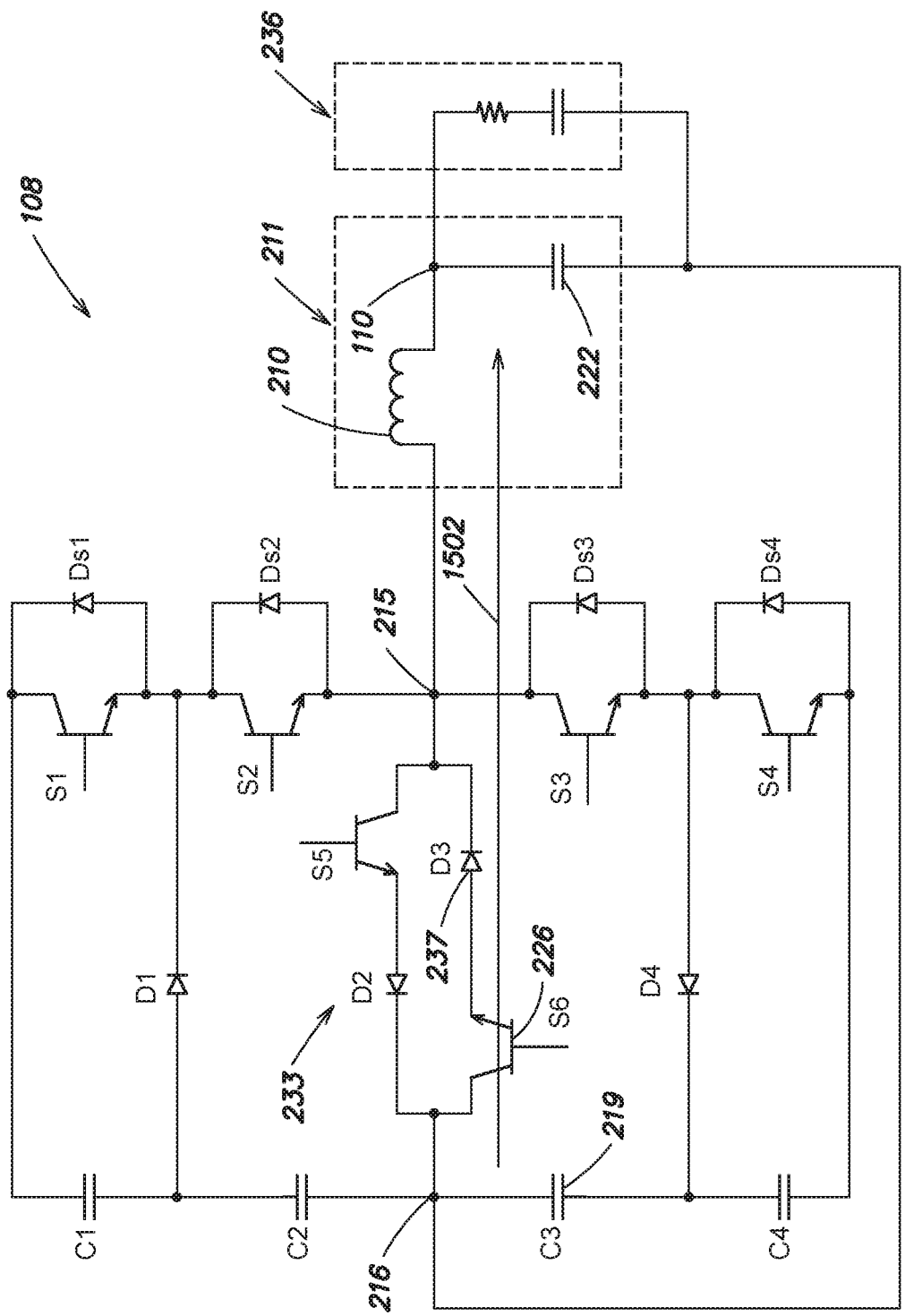
FIG. 15 is a schematic diagram of an inverter operating in a second stage of a sixth mode of operation according to aspects described herein.

FIGS. 4-15 are schematic diagrams of the inverter 108 operating in the different modes of operation (A-F). For example, FIG. 4 is a schematic diagram of the inverter 108 operating in a first stage of mode A, FIG. 5 is a schematic diagram of the inverter 108 operating in a second stage of mode A, FIG. 6 is a schematic diagram of the inverter 108 operating in a first stage of mode B, FIG. 7 is a schematic diagram of the inverter 108 operating in a second stage of mode B, FIG. 8 is a schematic diagram of the inverter 108 operating in a first stage of mode C, FIG. 9 is a schematic diagram of the inverter 108 operating in a second stage of mode C, FIG. 10 is a schematic diagram of the inverter 108 operating in a first stage of mode D, FIG. 11 is a schematic diagram of the inverter 108 operating in a second stage of mode D, FIG. 12 is a schematic diagram of the inverter 108 operating in a first stage of mode E, FIG. 13 is a schematic diagram of the inverter 108 operating in a second stage of mode E, FIG. 14 is a schematic diagram of the inverter 108 operating in a first stage of mode F, FIG. 15 is a schematic diagram of the inverter 108 operating in a second stage of mode F.

As similarly discussed above, in both the normal and backup modes of operation, the inverter 108 is configured to receive DC power from a DC source (e.g., the converter 104 and/or battery 112) via the input 201 and the controller 114 operates the inverter 108 in modes A-F to convert the DC power received by the busses 214, 218, 231, 235 from the converter 104 and/or battery 112 into regulated AC power and provide regulated AC power to the output 110.

In mode A, the controller 114 operates the first switch (S1) 202, third switch (S3) 206, fourth switch (S4) 208, and fifth switch (S5) 224 to turn off (i.e., open), and the sixth switch (S6) 226 to turn on (i.e., close). In mode A, the controller 114 also operates the second switch (S2) 204 to alternate (i.e., switch) between an open and closed state. FIG. 4 is a schematic diagram of the inverter 108 operating in a first stage of mode A, where the second switch (S2) 204 is closed. When the second switch (S2) 204 is closed, current 402 from the second capacitor (C2) 228 to the output 110 passes through the second positive bus 231, the first diode (D1) 232, the second switch (S2) 204, and the LC filter 211. During the first stage of mode A, a load 236 coupled to the output 110 draws energy from the second capacitor (C2) 228 and a voltage generated at the common point 215 (shown in FIG. 3 as the first trace 302) has a first positive level 308 equal to about half of the second positive voltage level 312 generated at the common point 215 during mode B (described below).

FIG. 5 is a schematic diagram of the inverter 108 operating in a second stage of mode A, where the second switch (S2) 204 is open. When the second switch (S2) 204 is open, current 502 from the mid-point bus 216 to the output 110 passes through the sixth switch (S6) 226, the third diode (D3) 237, the common point 215, and the LC filter 211. During the second stage of mode A, the voltage 302 at the common point 215 goes to zero 308. In mode A, the controller operates the second switch (S2) 204 to alternate between the first stage and the second stage to generate pulses at the common point 215 that alternate between zero 308 and the first positive level 310. The output current (shown in FIG. 3 as the third trace 306) at the output 110 during mode A is positive.

After mode A, the inverter 108 transitions to mode B. In mode B, the controller 114 operates the third switch (S3) 206, fourth switch (S4) 208, fifth switch (S5) 224, and sixth switch (S6) 226 to turn off, and the second switch (S2) 204 to turn on. In mode B, the controller 114 also operates the first switch (S1) 202 to alternate (i.e., switch) between an open and closed state. FIG. 6 is a schematic diagram of the inverter 108 operating in a first stage of mode B, where the first switch (S1) 202 is closed. When the first switch (S1) 202 is closed, current 602 from the second capacitor (C2) 228 to the output 110 passes through the first capacitor (C1) 217, the first positive bus 214, the first switch (S1) 202, the second switch (S2) 204, the common point 215, and the LC filter 211. During the first stage of mode B, a load 236 coupled to the output 110 draws energy from the first capacitor (C1) 217 and the second capacitor (C2) 228, and a voltage 302 generated at the common point 215 has a second positive level 312 equal to about double the first positive level 310 generated at the common point 215 during mode A (described above).

FIG. 7 is a schematic diagram of the inverter 108 operating in a second stage of mode B, where the first switch (S1) 202 is open. When the first switch (S1) 202 is open, current 702 from the second capacitor (C2) 228 to the output 110 passes through the second positive bus 231, the first diode (D1) 232, the second switch (S2) 204, and the LC filter 211. During the second stage of mode B, a load 236 coupled to the output 110 draws energy from the second capacitor (C2) 228 and a voltage 302 generated at the common point 215 is at the first positive level 310 (i.e., the same level as generated during the first stage of mode A). In mode B, the controller operates the first switch (S1) 202 to alternate between the first stage and the second stage to generate pulses at the common point 215 that alternate between the first 310 and the second positive level 312. The output current 306 at the output 110 during mode B is positive.

After mode B, the inverter 108 transitions back to mode A. Subsequent to transitioning back to mode A, the inverter 108 transitions to mode C. In mode C, the controller 114 operates the first switch (S1) 202, third switch (S3) 206, fourth switch (S4) 208, and sixth switch (S6) 226 to turn off. In mode B, the controller 114 also operates the second switch (S2) 204 and the fifth switch (S5) 224 in a switching complementary mode (i.e., one switch is closed while the other is open). FIG. 8 is a schematic diagram of the inverter 108 operating in a first stage of mode C, where the second switch (S2) 204 is closed and the fifth switch (S5) 224 is open. When the second switch (S2) 204 is closed and the fifth switch (S5) 224 is open, current 802 from the output 110 to the first capacitor (C1) 217 and the second capacitor (C2) 218 passes through the LC filter 211, the common point 215, the second switch (S2) 204 (including potentially the diode (Ds2) of the second switch (S2) 204), and the diode (Ds1) of the first switch (S1) 202. During the first stage of mode C, a load 236 coupled to the output 110 provides power back to the first capacitor (C1) 217 and the second capacitor (C2) 228 and a voltage 302 generated at the common point 215 is at the second positive level 312.

FIG. 9 is a schematic diagram of the inverter 108 operating in a second stage of mode C, where the second switch (S2) 204 is open and the fifth switch (S5) 224 is closed. When the second switch (S2) 204 is open and the fifth switch (S5) 224 is closed, current 902 from the output 110 to the mid-point bus 216 passes through the LC filter 211, the common point 215, the switch (S5) 224, and the second diode (D2) 234. During the second stage of mode C, the voltage at the common point 215 goes to zero. In mode C, the controller operates the second switch (S2) 204 and the fifth switch (S5) 224 to alternate between the first stage and the second stage to generate a pulse at the common point 215 that alternates between the second positive level 312 and zero 308. The output current 306 at the common point 215 during mode C is negative. The controller 114 adjusts the width of the common point pulses in modes A, B, and C to generate, in conjunction with the LC filter 211, a desired positive half cycle of the output voltage waveform 304 at the output 110.

After mode C, the inverter 108 transitions to mode D. In mode D, the controller 114 operates the first switch (S1) 202, second switch (S2) 204, fourth switch (S4) 208, and sixth switch (S6) 226 to turn off (i.e., open), and the fifth switch (S5) 224 to turn on (i.e., close). In mode D, the controller 114 also operates the third switch (S3) 206 to alternate (i.e., switch) between an open and closed state. FIG. 10 is a schematic diagram of the inverter 108 operating in a first stage of mode D, where the third switch (S3) 206 is closed. When the third switch (S3) 206 is closed, current 1002 from the output 110 to the third capacitor (C3) 219 passes through the LC filter 211, the common point 215, the third switch (S3) 206, the fourth diode (D4) 238, and the second negative bus 235. During the first stage of mode D, a load 236 coupled to the output 110 draws energy from the third capacitor (C3) 219 and a voltage 302 generated at the common point 215 has a first negative level 314 equal to about half of the second negative voltage level 316 generated at the common point 215 during mode E (described below).

FIG. 11 is a schematic diagram of the inverter 108 operating in a second stage of mode D, where the third switch (S3) 206 is open. When the third switch (S3) 206 is open, current 1102 from the output 110 to the mid-point bus 216 passes through the LC filter 211, the common point 215, the fifth switch (S5) 224, and the second diode (D2) 234. During the second stage of mode D, the voltage 302 at the common point 215 goes to zero 308. In mode D, the controller operates the third switch (S3) 206 to alternate between the first stage and the second stage to generate pulses at the common point 215 that alternate between zero 308 and the first negative level 314. The output current 306 at the output 110 during mode D is negative.

After mode D, the inverter 108 transitions to mode E. In mode E, the controller 114 operates the first switch (S1) 202, second switch (S2) 204, fifth switch (S5) 224, and sixth switch (S6) 226 to turn off (i.e., open), and the third switch (S3) 224 to turn on (i.e., close). In mode E, the controller 114 also operates the fourth switch (S4) 208 to alternate (i.e., switch) between an open and closed state. FIG. 12 is a schematic diagram of the inverter 108 operating in a first stage of mode E, where the fourth switch (S4) 208 is closed. When the fourth switch (S4) 208 is closed, current 1202 from the output 110 to the third capacitor (C3) 219 passes through the LC filter 211, the third switch (S3) 206, the fourth switch (S4) 208, the first negative bus 218, and the fourth capacitor (C4) 230. During the first stage of mode E, a load 236 coupled to the output 110 draws energy from the third capacitor (C3) 219 and the fourth capacitor (C4) 230, and a voltage 302 generated at the common point 215 has a second negative level 316 equal to about double the first negative level 314 generated at the common point 215 during mode D (described above).

FIG. 13 is a schematic diagram of the inverter 108 operating in a second stage of mode E, where the fourth switch (S4) 208 is open. When the fourth switch (S4) 208 is open, current 1302 from the output 110 to the third capacitor (C3) 219 passes through the LC filter 211, the common point 215, the third switch (S3) 206, the fourth diode (D4) 238, and the second negative bus 235. During the second stage of mode E, a load 236 coupled to the output 110 draws energy from the third capacitor (C3) 219 and a voltage 302 generated at the common point 215 has the first negative level 314. In mode E, the controller operates the fourth switch (S4) 208 to alternate between the first stage and the second stage to generate pulses at the common point 215 that alternate between the first 314 and the second negative levels 316. The output current 306 at the output 110 during mode E is negative.

After mode E, the inverter 108 transitions back to mode D. Subsequent to transitioning back to mode D, the inverter 108 transitions to mode F. In mode F, the controller 114 operates the first switch (S1) 202, second switch (S2) 204, fourth switch (S4) 208, and fifth switch (S5) 224 to turn off. In mode F, the controller 114 also operates the third switch (S3) 206 and the sixth switch (S6) 226 in a switching complementary mode (i.e., one switch is closed while the other is open). FIG. 14 is a schematic diagram of the inverter 108 operating in a first stage of mode F, where the third switch (S3) 206 is closed and the sixth switch (S6) 226 is open. When the third switch (S3) 206 is closed and the sixth switch (S6) 226 is open, current 1402 from the third capacitor (C3) 219 and the fourth capacitor (C4) 230 to the output 110 passes through the first negative bus 218, the diode (Ds4) of the fourth switch (S4) 208, the third switch (S3) 206 (including potentially the diode (Ds3) of the third switch (S3) 206), the common point 215, and the LC filter 211. During the first stage of mode F, a load 236 coupled to the output 110 provides power back to the third capacitor (C3) 219 and the fourth capacitor (C4) 230 and a voltage 302 generated at the common point 215 is at the second negative level 316.

FIG. 15 is a schematic diagram of the inverter 108 operating in a second stage of mode F, where the third switch (S3) 206 is open and the sixth switch (S6) 226 is closed. When the third switch (S3) 206 is open and the sixth switch (S6) 226 is closed, current 1502 from the mid-point bus 216 to the output 110 passes through the sixth switch (S6) 226, the third diode (D3) 237, the common point 215, and the LC filter 211. During the second stage of mode F, the voltage at the common point 215 goes to zero. In mode F, the controller operates the third switch (S3) 206 and the sixth switch (S6) 226 to alternate between the first stage and the second stage to generate a pulse at the common point 215 that alternates between the second negative level 316 and zero 308. The output current 306 at the common point 215 during mode F is positive. The controller 114 adjusts the width of the common point pulses in modes D, E, and F to generate, in conjunction with the LC filter 211, a desired negative half cycle of the output voltage waveform 304 at the output 110.

Figure 16:
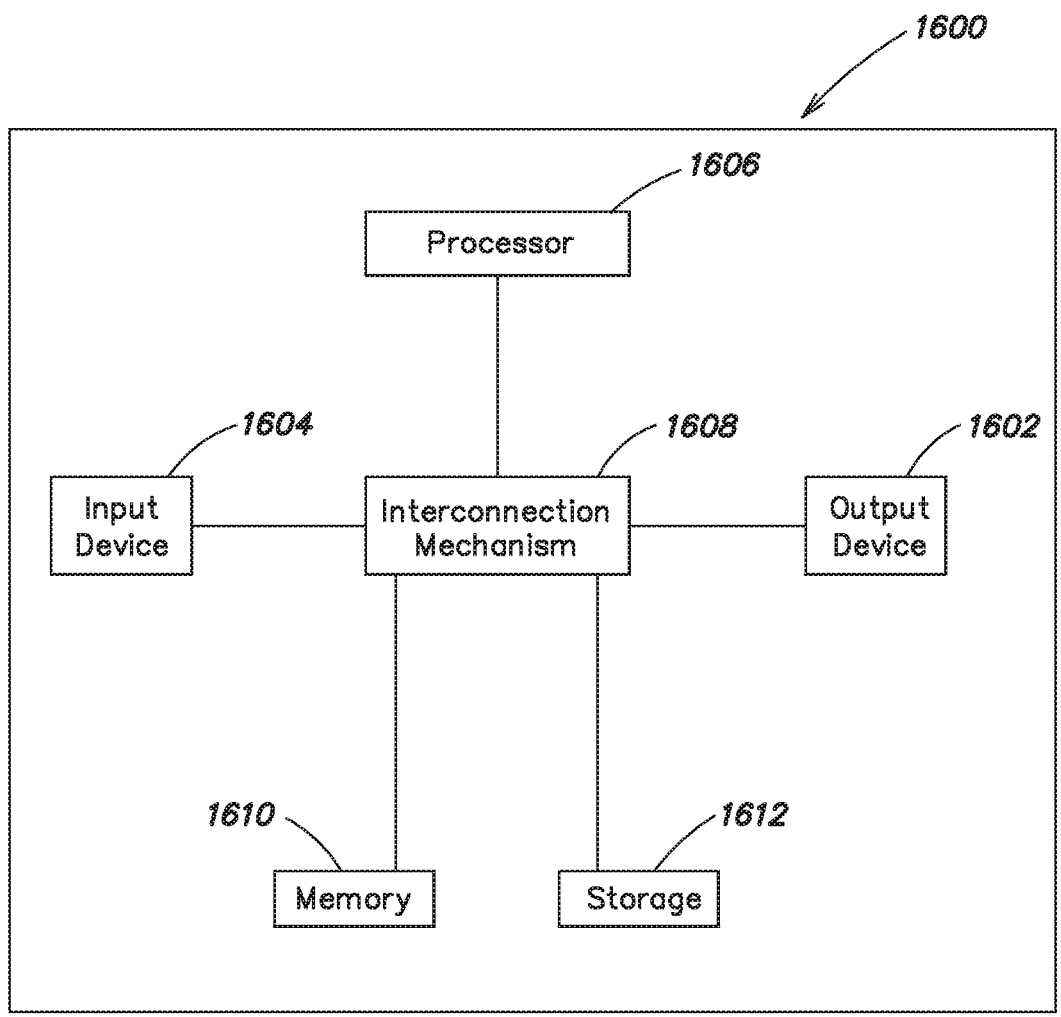
FIG. 16 is block diagram of a system upon which various embodiments of the invention may be implemented.

FIG. 16 illustrates an example block diagram of computing components forming a system 1600 which may be configured to implement one or more aspects disclosed herein. For example, the system 1600 may be communicatively coupled to the controller 114 or included within the controller 114. The system 1600 may also be configured to operate an inverter as discussed above.

The system 1600 may include for example a computing platform such as those based on Intel PENTIUM-type processor, Motorola PowerPC, Sun UltraSPARC, Texas Instruments-DSP, Hewlett-Packard PA-RISC processors, or any other type of processor. System 1600 may include specially-programmed, special-purpose hardware, for example, an application-specific integrated circuit (ASIC). System 1600 may also include a Field Programmable Gate Array (FPGA). Various aspects of the present disclosure may be implemented as specialized software executing on the system 1600 such as that shown in FIG. 16.

The system 1600 may include a processor/ASIC 1606 connected to one or more memory devices 1610, such as a disk drive, memory, flash memory or other device for storing data. Memory 1610 may be used for storing programs and data during operation of the system 1600. Components of the computer system 1600 may be coupled by an interconnection mechanism 1608, which may include one or more buses (e.g., between components that are integrated within a same machine) and/or a network (e.g., between components that reside on separate machines). The interconnection mechanism 1608 enables communications (e.g., data, instructions) to be exchanged between components of the system 1600. The system 1600 also includes one or more input devices 1604, which may include for example, a keyboard or a touch screen. The system 1600 includes one or more output devices 1602, which may include for example a display. In addition, the computer system 1600 may contain one or more interfaces (not shown) that may connect the computer system 1600 to a communication network, in addition or as an alternative to the interconnection mechanism 1608.

The system 1600 may include a storage system 1612, which may include a computer readable and/or writeable nonvolatile medium in which signals may be stored to provide a program to be executed by the processor or to provide information stored on or in the medium to be processed by the program. The medium may, for example, be a disk or flash memory and in some examples may include RAM or other non-volatile memory such as EEPROM. In some embodiments, the processor may cause data to be read from the nonvolatile medium into another memory 1610 that allows for faster access to the information by the processor/ASIC than does the medium. This memory 1610 may be a volatile, random access memory such as a dynamic random access memory (DRAM) or static memory (SRAM). It may be located in storage system 1612 or in memory system 1610. The processor 1606 may manipulate the data within the integrated circuit memory 1610 and then copy the data to the storage 1612 after processing is completed. A variety of mechanisms are known for managing data movement between storage 1612 and the integrated circuit memory element 1610, and the disclosure is not limited thereto. The disclosure is not limited to a particular memory system 1610 or a storage system 1612.

The system 1600 may include a computer platform that is programmable using a high-level computer programming language. The system 1600 may be also implemented using specially programmed, special purpose hardware, e.g. an ASIC. The system 1600 may include a processor 1606, which may be a commercially available processor such as the well-known Pentium class processor available from the Intel Corporation. Many other processors are available. The processor 1606 may execute an operating system which may be, for example, a Windows operating system available from the Microsoft Corporation, MAC OS System X available from Apple Computer, the Solaris Operating System available from Sun Microsystems, or UNIX and/or LINUX available from various sources. Many other operating systems may be used.

The processor and operating system together may form a computer platform for which application programs in high-level programming languages may be written. It should be understood that the disclosure is not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

As described above, the inverter 108 can be utilized with an online UPS; however, in other embodiments, the inverter 108 can be utilized with another type of UPS and/or another type of power system which needs DC to AC conversion.

As discussed herein, a quasi-five-level inverter system and method is provided that can reduce the traditional five-level inverter disadvantages described above while providing relatively high efficiency and low harmonic distortion. By utilizing a bidirectional switch 233 in conjunction with diodes D1 and D4 as discussed above, the quasi-five-level inverter system described herein can switch between five voltage levels and generate a desired output voltage waveform, while having a simpler construction, utilizing fewer power switches, and having a lower cost, than traditional five-level inverters.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An inverter comprising:
an input configured to be coupled to a DC source and to receive input DC power from the DC source;
an output configured to be coupled to a load and to provide output AC power to the load;
a plurality of DC busses coupled to the input and configured to receive the input DC power from the DC source;
a mid-point bus coupled to the input and to the plurality of DC busses;
an LC filter coupled to the output;
a common node coupled to the LC filter;
a plurality of switches coupled to the plurality of DC busses and the common node;
a bidirectional switch coupled between the mid-point bus and the common node; and
a controller configured to operate the plurality of switches and the bidirectional switch in a first mode of operation to generate a voltage at the common node at a first positive DC voltage level, to operate the plurality of switches and the bidirectional switch in a second mode of operation to generate the voltage at the common node at a second positive DC voltage level, to operate the plurality of switches and the bidirectional switch in a third mode of operation to generate the voltage at the common node at a first negative DC voltage level, and to operate the plurality of switches and the bidirectional switch in a fourth mode of operation to generate the voltage at the common node at a second negative DC voltage level,
wherein during the first, second, third, and fourth modes of operation, the controller is further configured to modulate at least one switch of the plurality of switches and operate the bidirectional switch in a static state.

2. The inverter of claim 1, wherein the LC filter is configured to provide an output AC voltage waveform to the output derived from the voltage at the common node during the first, second, third, and fourth modes of operation.

3. The inverter of claim 1, wherein in the first mode of operation, the controller is further configured to operate the plurality of switches and the bidirectional switch to generate voltage pulses at the common node alternating between zero and the first positive DC voltage level, in the second mode of operation, the controller is further configured to operate the plurality of switches and the bidirectional switch to generate voltage pulses at the common node alternating between the first positive DC voltage level and the second positive DC voltage level, in the third mode of operation, the controller is further configured to operate the plurality of switches and the bidirectional switch to generate voltage pulses at the common node alternating between zero and the first negative DC voltage level, and in the fourth mode of operation, the controller is further configured to operate the plurality of switches and the bidirectional switch to generate voltage pulses at the common node alternating between the first negative DC voltage level and the second negative DC voltage level.

4. The inverter of claim 1,
wherein the plurality of DC busses comprises:
a first positive DC bus coupled to the input;
a second positive DC bus coupled to the input;
a first negative DC bus coupled to the input; and
a second negative DC bus coupled to the input, and
wherein the plurality of switches comprises:
a first switch coupled to the first positive DC Bus;
a second switch coupled between the first switch and the common node;
a third switch coupled to the first negative DC bus; and
a fourth switch coupled between the third switch and the common node.

5. The inverter of claim 4, further comprising:
a first diode coupled between the second positive DC bus and the second switch; and
a second diode coupled between the second negative DC bus and the fourth switch.

6. The inverter of claim 5, further comprising:
a first capacitor coupled between the first positive DC bus and the second positive DC bus;
a second capacitor coupled between the second positive DC bus and the mid-point bus;
a third capacitor coupled between the first negative DC bus and the second negative DC bus; and
a fourth capacitor coupled between the second negative DC bus and the mid-point bus.

7. The inverter of claim 6, wherein the controller is further configured to operate, in a first stage of the first mode of operation, the plurality of switches to provide current from the second capacitor to the common point via the second positive DC bus, the first diode, and the second switch, and to operate, in a second stage of the first mode of operation, the bidirectional switch to provide current from the mid-point bus to the common node via the bidirectional switch.

8. The inverter of claim 7, wherein the controller is further configured to operate, in a first stage of the second mode of operation, the plurality of switches to provide current from the first capacitor to the common point via the first positive DC bus, the first switch, and the second switch, and to operate, in a second stage of the second mode of operation, the plurality of switches to provide current from the second capacitor to the common point via the second positive DC bus, the first diode, and the second switch.

9. The inverter of claim 8, wherein the controller is further configured to operate, in a first stage of the third mode of operation, the plurality of switches to provide current from the common point to the third capacitor via the second negative DC bus, the second diode, and the fourth switch, and to operate, in a second stage of the third mode of operation, the bidirectional switch to provide current from the common node to the mid-point bus via the bidirectional switch.

10. The inverter of claim 9, wherein the controller is further configured to operate, in a first stage of the fourth mode of operation, the plurality of switches to provide current from the common point to the fourth capacitor via the first negative DC bus, the third switch, and the fourth switch, and to operate, in a second stage of the fourth mode of operation, the plurality of switches to provide current from the common point to the third capacitor via the second negative DC bus, the second diode, and the fourth switch.

11. The inverter of claim 10, wherein the controller is further configured to operate, in a first stage of a fifth mode of operation occurring during a transition from the second mode of operation to the third mode of operation, the plurality of switches to provide current from the common point to the first capacitor via the first positive DC bus, the first switch, and the second switch, and to operate, in a second stage of the fifth mode of operation, the bidirectional switch to provide current from the common node to the mid-point bus via the bidirectional switch.

12. The inverter of claim 11, wherein the controller is further configured to operate, in a first stage of a sixth mode of operation occurring during a transition from the third mode of operation to the second mode of operation, the plurality of switches to provide current from the fourth capacitor to the common point via the first negative DC bus, the third switch, and the fourth switch, and to operate, in a second stage of the sixth mode of operation, the bidirectional switch to provide current from the mid-point bus to the common node via the bidirectional switch.

13. The inverter of claim 12, wherein the bidirectional switch comprises:
a third diode coupled to the mid-point bus;
a fifth switch coupled between the third diode and the common point;
a fourth diode coupled to the common point; and
a sixth switch coupled between the fourth diode and the mid-point bus.

14. A method for operating an inverter comprising an input configured to be coupled to a DC source, an output, a plurality of DC busses, a mid-point bus coupled to the input and to the plurality of DC busses, an LC filter coupled to the output, a common node coupled to the LC filter, a plurality of switches coupled to the plurality of DC busses and the common node, and a bidirectional switch coupled between the mid-point bus and the common node, the method comprising:
receiving, at the input, input DC power from a DC source;
operating the plurality of switches and the bidirectional switch in a first mode of operation to generate a voltage at the common node at a first positive DC voltage level by modulating at least one switch of the plurality switches and operating the bidirectional switch in a static state;
operating the plurality of switches and the bidirectional switch in a second mode of operation to generate the voltage at the common node at a second positive DC voltage level by modulating at least one switch of the plurality of switches and operating the bidirectional switch in a static state;
operating the plurality of switches and the bidirectional switch in a third mode of operation to generate the voltage at the common node at a first negative DC voltage level by modulating at least one switch of the plurality of switches and operating the bidirectional switch in a static state;

operating the plurality of switches and the bidirectional switch in a fourth mode of operation to generate the voltage at the common node at a second negative DC voltage level by modulating at least one switch of the plurality of switches and operating the bidirectional switch in a static state; and generating, with the LC filter, an output AC voltage waveform at the output derived from the voltage at the common node during the first, second, third, and fourth modes of operation.

15. The method of claim 14, wherein operating the plurality of switches and the bidirectional switch in the first mode of operation includes operating the plurality of switches and the bidirectional switch to generate voltage pulses at the common node alternating between zero and the first positive DC voltage level, wherein operating the plurality of switches and the bidirectional switch in the second mode of operation includes operating the plurality of switches and the bidirectional switch to generate voltage pulses at the common node alternating between the first positive DC voltage level and the second positive DC voltage level, wherein operating the plurality of switches and the bidirectional switch in the third mode of operation includes operating the plurality of switches and the bidirectional switch to generate voltage pulses at the common node alternating between zero and the first negative DC voltage level, and wherein operating the plurality of switches and the bidirectional switch in the fourth mode of operation includes operating the plurality of switches and the bidirectional switch to generate voltage pulses at the common node alternating between the first negative DC voltage level and the second negative DC voltage level.

16. The method according to claim 15, wherein the plurality of DC busses includes a first positive DC bus, a second positive DC bus, a first negative DC bus, and a second negative DC bus, wherein the plurality of switches comprises a first switch coupled to the first positive DC Bus, a second switch coupled between the first switch and the common node, a third switch coupled to the first negative DC bus, and a fourth switch coupled between the third switch and the common node, and wherein operating the plurality of switches and the bidirectional switch to generate the voltage pulses at the common node alternating between zero and the first positive DC voltage level includes:

operating, in a first stage of the first mode of operation, the plurality of switches to provide current from the mid-point bus to the common point via the second positive DC bus and the second switch; and operating, in a second stage of the first mode of operation, the bidirectional switch to provide current from the mid-point bus to the common node via the bidirectional switch.

17. The method according to claim 16, wherein operating the plurality of switches and the bidirectional switch to generate the voltage pulses at the common node alternating between the first positive DC voltage level and the second positive DC voltage level includes:

operating, in a first stage of the second mode of operation, the plurality of switches to provide current from the mid-point bus to the common point via the first positive DC bus, the first switch, and the second switch; and operating, in a second stage of the second mode of operation, the plurality of switches to provide current from the mid-point bus to the common point via the second positive DC bus and the second switch.

18. The method according to claim 17, wherein operating the plurality of switches and the bidirectional switch to generate the voltage pulses at the common node alternating between zero and the first negative DC voltage level includes:

operating, in a first stage of the third mode of operation, the plurality of switches to provide current from the common point to the mid-point bus via the second negative DC bus and the fourth switch; and operating, in a second stage of the third mode of operation, the bidirectional switch to provide current from the common node to the mid-point bus via the bidirectional switch.

19. The inverter of claim 18, wherein operating the plurality of switches and the bidirectional switch to generate the voltage pulses at the common node alternating between the first negative DC voltage level and the second negative DC voltage level includes:

operating, in a first stage of the fourth mode of operation, the plurality of switches to provide current from the common point to the mid-point bus via the first negative DC bus, the third switch, and the fourth switch; and operating, in a second stage of the fourth mode of operation, the plurality of switches to provide current from the common point to the mid-point bus via the second negative DC bus and the fourth switch.

20. An inverter comprising:
an input configured to be coupled to a DC source and to receive input DC power from the DC source;
an output configured to be coupled to a load and to provide output AC power to the load;
a plurality of DC busses coupled to the input and configured to receive the input DC power from the DC source;
a mid-point bus coupled to the input and to the plurality of DC busses;
an LC filter coupled to the output;
a common node coupled to the LC filter;
a plurality of switches coupled to the plurality of DC busses and the common node; and
means for statically coupling the mid-point bus to the common node and modulating at least one switch of the plurality of switches to switch a voltage at the common node to a first positive DC voltage level during a first mode of operation, a second positive DC voltage level during a second mode of operation, a first negative DC voltage level during a third mode of operation, and a second negative DC voltage level during a fourth mode of operation, and for providing an output AC voltage waveform to the output derived from the different voltage levels.

* * * * *